(12) United States Patent
Mizutani et al.

(10) Patent No.: US 7,688,216 B2
(45) Date of Patent: Mar. 30, 2010

(54) WIRELESS SENSOR SYSTEM AND WHEEL SUPPORT BEARING ASSEMBLY UTILIZING THE SAME

(75) Inventors: Masatoshi Mizutani, Iwata (JP); Hiroyoshi Ito, Kuwana (JP); Koji Sahashi, Iwata (JP); Koichi Okada, Iwata (JP)

(73) Assignee: NTN Corporation, Osaka (JP)

( * ) Notice: Subject to any disclaimer, the term of this patent is extended or adjusted under 35 U.S.C. 154(b) by 1041 days.

(21) Appl. No.: 10/569,053

(22) PCT Filed: Mar. 10, 2004

(86) PCT No.: PCT/JP2004/003138

§ 371 (c)(1),
(2), (4) Date: Feb. 22, 2006

(87) PCT Pub. No.: WO2005/024750

PCT Pub. Date: Mar. 17, 2005

(65) Prior Publication Data

US 2007/0018837 A1    Jan. 25, 2007

(30) Foreign Application Priority Data

Aug. 29, 2003  (JP) .............................. 2003-306964
Aug. 29, 2003  (JP) .............................. 2003-307515

(51) Int. Cl.
*G08B 21/00* (2006.01)
(52) U.S. Cl. ........................ 340/635; 340/660; 340/663; 340/442
(58) Field of Classification Search ................ 340/635, 340/442, 447, 660, 663
See application file for complete search history.

(56) References Cited

U.S. PATENT DOCUMENTS 4,263,579 A  4/1981  Corgan et al.
4,749,993 A  6/1988  Szabo et al.

(Continued)

FOREIGN PATENT DOCUMENTS

CN    1412564    4/2003

(Continued)

OTHER PUBLICATIONS

U.S. Appl. No. 10/572,308, filed Mar. 17, 2006, Mitzutani et al., NTN Corporation.

(Continued)

*Primary Examiner*—Eric M Blount

(57) ABSTRACT

To provide a wireless sensor system, in which an abnormal power supply in the power supply section can be ascertained, for avoiding a malfunction of the system and accomplishing a stable power supply with reduction of the consumption of a power being transmitted, the wireless sensor system includes wireless sensor units and a sensor signal receiving unit. The wireless sensor units include a sensor section for detecting a detection object, a sensor signal transmitting section for transmitting by wireless a sensor signal from the sensor section, and a power supply section having a power receiving section for receiving a driving power transmitted by wireless. In this system, a power supply monitoring section is provided for monitoring the voltage of the power supply section. The sensor signal receiving unit includes a monitor dependent power control section for regulating the power to be transmitted, depending on a monitored result of the power monitoring section.

17 Claims, 17 Drawing Sheets

U.S. PATENT DOCUMENTS

| | | | |
|---|---|---|---|
| 4,966,034 A | 10/1990 | Bock et al. | |
| 5,193,387 A | 3/1993 | Hodate | |
| 5,721,528 A * | 2/1998 | Boesch et al. | 340/442 |
| 5,731,754 A * | 3/1998 | Lee et al. | 340/447 |
| 6,545,599 B2 * | 4/2003 | Derbyshire et al. | 340/442 |
| 6,585,420 B2 | 7/2003 | Okada et al. | |
| 6,591,671 B2 * | 7/2003 | Brown | 73/146.5 |
| 6,617,963 B1 * | 9/2003 | Watters et al. | 340/10.41 |
| 6,691,567 B2 * | 2/2004 | Walker et al. | 73/146 |
| 6,696,935 B2 * | 2/2004 | Bonardi et al. | 340/447 |
| 6,771,169 B1 * | 8/2004 | Kaminski et al. | 340/442 |
| 6,838,985 B2 | 1/2005 | Ghabra et al. | |
| 6,906,624 B2 * | 6/2005 | McClelland et al. | 340/442 |
| 6,958,685 B2 | 10/2005 | Desai | |
| 6,980,084 B1 * | 12/2005 | Yones | 340/10.34 |
| 7,018,106 B2 * | 3/2006 | Okada | 384/448 |
| 7,021,132 B2 | 4/2006 | Nigon et al. | |
| 7,034,711 B2 * | 4/2006 | Sakatani et al. | 340/686.1 |
| 7,104,438 B2 | 9/2006 | Benedict | |
| 7,148,793 B2 | 12/2006 | Lin | |
| 7,429,936 B2 * | 9/2008 | Paradiso et al. | 340/988 |
| 2002/0033638 A1 | 3/2002 | Okada et al. | |
| 2003/0030565 A1 | 2/2003 | Sakatani et al. | |
| 2003/0093188 A1 | 5/2003 | Morita et al. | |
| 2003/0110860 A1 | 6/2003 | Okada | |
| 2004/0150516 A1 | 8/2004 | Faetanini | |
| 2005/0046559 A1 | 3/2005 | Kulha | |
| 2005/0068161 A1 | 3/2005 | Ichinose et al. | |
| 2005/0210340 A1 * | 9/2005 | Townsend et al. | 714/701 |
| 2005/0231346 A1 | 10/2005 | Ichinose et al. | |

FOREIGN PATENT DOCUMENTS

| | | |
|---|---|---|
| CN | 1424212 | 6/2003 |
| JP | 64-60118 | 3/1989 |
| JP | 4-65800 | 3/1992 |
| JP | 4-133808 | 5/1992 |
| JP | 8-10232 | 1/1996 |
| JP | 9-5178 | 1/1997 |
| JP | 10-10141 | 1/1998 |
| JP | 10-19710 | 1/1998 |
| JP | 11-238193 | 8/1999 |
| JP | 2001-15090 | 6/2001 |
| JP | 2001-349794 | 12/2001 |
| JP | 2002-55113 | 2/2002 |
| JP | 2002-364661 | 12/2002 |
| JP | 2003-58976 | 2/2003 |
| JP | 2003-146196 | 5/2003 |
| JP | 2003-151063 | 5/2003 |
| JP | 2003-151064 | 5/2003 |
| JP | 2003-187368 | 7/2003 |
| WO | WO 00/69663 | 11/2000 |

OTHER PUBLICATIONS

U.S. Appl. No. 10/526,903, filed Mar. 7, 2005, Sahashi et al, NTN Corporation.

Office Action mailed Feb. 24, 2009 for co-pending U.S. Appl. No. 10/572,308.

* cited by examiner

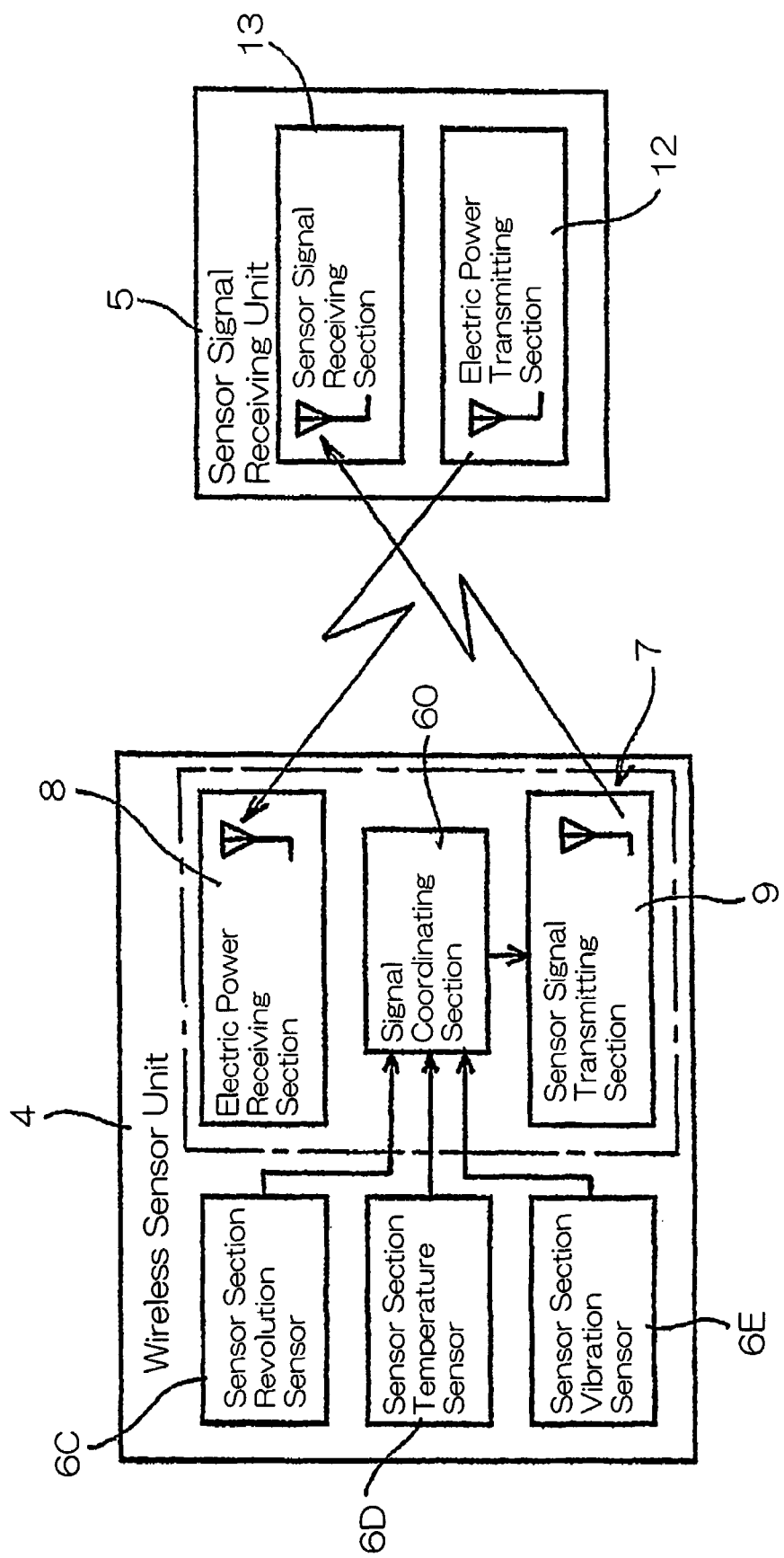

WIRELESS SENSOR SYSTEM AND WHEEL SUPPORT BEARING ASSEMBLY UTILIZING THE SAME

This application claims the benefit of PCT International Application Number PCT/JP2004/003138 filed Mar. 10, 2004 and Japanese Application Nos. 2003-306964 and 2003-307515, filed Aug. 29, 2003, in Japan, the disclosures of which are incorporated herein by reference.

FIELD OF THE INVENTION

The present invention relates to a wireless sensor system for wirelessly transmitting various sensor signals, for example, those generated from various sensors installed in a wheel support bearing assembly in various machine, equipment and automotive vehicles and also to a wheel support bearing assembly utilizing such wireless sensor system.

BACKGROUND ART

A wireless ABS (anti-skid brake system) sensor system has been suggested, in which sensor signals generated from a revolution sensor mounted on a wheel support bearing assembly is transmitted by wireless between a vehicle wheel and an automotive body to thereby eliminate the use of harnesses. On the other hand, the Japanese Laid-open Patent Publication No. 2003-146196, published May 21, 2003, discloses the system in which in a wheel support bearing assembly equipped with a revolution sensor, output signals of which are transmitted by wireless, the presence or absence of an abnormality in the revolution sensor is determined by means of a self-diagnosing circuit and an abnormality indication signal when generated from such circuit can be transmitted by wireless. Those suggestions require that supply of an electric power to the revolution sensor and also to a wireless transmitting system to be provided for by the revolution sensor that concurrently serves as an electric power generator but supply of an electric power by wireless from an outside power source is also referred to in those suggestions.

DISCLOSURE OF THE INVENTION

In the wireless sensor system in which an electric operating power is supplied through supply of the electric power by wireless, the wireless supply of the electric power is carried out by the utilization of electromagnetic waves or light waves. The wireless supply of the electric power tends to be adversely affected by obstacles present between the transmitter and the receiver and/or by a relative movement of the receiver to the transmitter, and vice versa, to such an extent as to result in failure to supply the sufficient amount of electric power and, therefore, care must be taken in selecting where to install. For this reason, there is a problem in that continued supply of the large amount of electric power as a precaution against the failure of the electric power supply may result in increase of the electric power consumption of the system as a whole. Also, in the system in which the electric power supply is carried out from the revolution sensor concurrently serving as an electric power generator, the wireless sensor system may occasionally fail to operate properly as a result of abnormality occurring in the transmission system when an abnormality is detected. Provision of an abnormality detecting means in each of the sensor system and the transmission system will render the wireless sensor system as a whole to be complicated in configuration.

Accordingly, an object of the present invention is to provide a wireless sensor system of a simplified structure, in which the presence or absence of an abnormality in electric power supply occurring in electric power supply section for supplying an electric driving power to the sensors and the sensor signal transmitting section can be ascertained and which is also effective to avoid an erroneous operation of the wireless sensor system resulting from an erroneous operation of the sensors and/or the sensor signal transmitting sections.

Another object of the present invention is to accomplish a stable electric power supply, accompanied by reduction of the consumption of an electric power being transmitted.

A further object of the present invention is to provide a wireless sensor equipped bearing assembly, which is capable of rendering a bearing assembly to be intelligent and to have a simplified wiring system, in which the presence or absence of an abnormality in electric power supply to the sensors and the sensor signal transmitting section can be ascertained to minimize the occurrence of an erroneous operation and the consumption of the electric power, and which makes use of a simplified in structure for minimizing those erroneous operations.

A still further object of the present invention is to obtain the functionality of the wireless sensor equipped bearing assembly in a wheel support bearing assembly.

The wireless sensor system of the present invention includes, in reference to FIG. 1, one or a plurality of wireless sensor units (4A, 4B) including a sensor section (6A, 6B) for detecting a detection object, a sensor signal transmitting section (9A, 9B) for transmitting by wireless a sensor signal outputted from the sensor section (6A, 6B), and an electric power supply section (10) for supplying an electric driving power to the sensor section (6A, 6B) and the sensor signal transmitting section (9A, 9B); and a sensor signal receiving unit (13) for receiving the sensor signal transmitted from the sensor signal transmitting section (9A, 9B), and is characterized by comprising an electric power supply monitoring section (7) for monitoring a voltage of the electric power supply section (10).

According to the present invention, the voltage of the electric power supplied, as the electric driving power, from the electric power supply section (10) to the sensor section (6A, 6B) and also to the sensor signal transmitting section (9A, 9B) is monitored by the electric power supply monitoring section (7). Accordingly, if the occurrence of an abnormality in electric power supply is indicated, any erroneous operation of the sensor section (6A, 6B) and/or that of the wireless sensor system can be prevented. Also, since the electric driving power of the electric power supply section (10) is monitored, the occurrence of an abnormality in electric power supply in the sensor section (6A, 6B) and in the sensor signal transmitting section (9A, 9B) resulting from the failure of electric power supply can be both detected and, as compared with the case in which separate abnormality detecting means are employed, the structure can be simplified.

In the present invention, the electric power supply section (10) referred to above may include an electric power receiving section (8A, 8B) for receiving an electric driving power transmitted by wireless from a feed power transmitting section. Wireless transmission and receipt of the sensor signal and the electric operating power may be carried out by the utilization of electromagnetic waves, magnetic coupling, light and ultrasonic waves or any other medium that can accomplish them by wireless.

In the case of the wireless supply of the electric power, it is necessary to transmit a large electric power for the supply of the electric power since as compared with the wired supply of the electric power or a built-in electric power generator, the efficiency is relatively low. However, if the electric power supply is monitored and the presence of an abnormality in electric power supply and feed power signal are indicated to the transmitting side, the electric power to be transmitted by wireless for the wireless electric power supply can be controlled so that the stabilized electric power supply can be accomplished while reducing the consumption of the electric transmitting power.

By way of example, where the electric power receiving section (8A, 8B) referred to above is employed, the electric power supply monitoring section (7) may be designed to allow a monitored result information to be transmitted from the sensor signal transmitting section (9A, 9B). In such case, a monitor dependent control section (14) may be employed for regulating an electric power to be transmitted from the feed power transmitting section, in dependence on a monitored result information from the electric power supply monitoring section (7).

Considering that the monitored result information of the voltage of the electric power to be supplied can be transmitted, the receiving side of the sensor signal can recognize the monitored result information and, therefore, a countermeasure appropriate to the result of the monitoring can be taken. In particular, where the wireless supply of the electric power takes place from the feed power transmitting section, the provision of the monitor dependent control section (14) is effective to allow the electric power to be transmitted for the wireless electric power supply to be controlled in dependence on the monitored result information on the voltage of the electric power to be supplied. Accordingly, there is no need to transmit the large electric power at all times and the electric power consumption of the wireless sensor system can therefore be reduced.

The feed power transmitting section (12) referred to above may be provided in a sensor signal receiving unit (5) including the sensor signal receiving section (13). Where the monitor dependent control section (14) is employed, this monitor dependent control section (14) is also provided in the sensor signal receiving unit (5). Although the sensor signal receiving section (13) and the feed power transmitting means (12) may be arranged in spaced relation to each other, the provision of the both in the sensor signal receiving unit (5) is effective to simplify the structure of the wireless sensor system.

The electric power supply monitoring section (7) may be of a type capable of monitoring the voltage after the electric power received by the electric power receiving section (12) has been converted into a direct current. If the voltage after the conversion into the direct current is monitored, the monitoring can be accomplished easily and the electric power supply monitoring section (7) can have a simplified structure.

The sensor signal transmitting section (9A, 9B) may be of a type capable of transmitting a predetermined normal indication signal when the voltage monitored by the electric power supply monitoring section (7) is equal to or higher than, or exceeds, a predetermined threshold value, and interrupts the transmission of the normal indication signal when such voltage is lower than, or equal to or lower than, the predetermined threshold value. Also, arrangement may be made that a predetermined abnormality indication signal can be transmitted during the interruption. The predetermined normal indication signal may be an electric power voltage signal and may be in the form of, for example, the sensor signal superimposed with the electric power voltage signal. In this way, when the transmission of the normal indication signal is interrupted when the voltage is lower than the threshold value, or the predetermined abnormality indication signal is further transmitted, the presence or absence of an abnormality can easily be recognized on the receiving side of the sensor signal. Also, as compared with the use of a transmitting and receiving means for transmitting and receiving correct and error signals separate from the sensor signal transmitting section (9A, 9B), the structure can be simplified.

In the present invention, the sensor section (6A, 6B) referred to above may include a revolution sensor (6Ab) having an electric power generating function and the electric power supply section (10) may utilize an electric power generated by the revolution sensor (6Ab). In such case, the wireless supplied electric power and the generated electric power can be concurrently employed.

Even where the electric power generated by the revolution sensor (6Ab) is utilized, the provision of the electric power supply monitoring section (7) for monitoring the voltage of the electric power supply section (10), which supplies the electric driving power to the sensor section (6A, 6B) and the sensor signal transmitting section (9A, 9B), is effective to allow the abnormality occurring in the supply of the electric power to the sensor section (6A, 6B) and to the sensor signal transmitting section (9A, 9B) resulting from an electric power supply failure to be detected and, therefore, as compared with the use of separate abnormality detecting means, the system can be simplified in structure.

In the present invention, the sensor section (6A, 6B) may include at least one of a vibration sensor, a temperature sensor, a load sensor, a torque sensor, and a preload sensor for detecting a preload of a bearing assembly.

In the wireless sensor system of the present invention as described above, the sensor section (6A to 6E) may be provided in a plural number.

Where the plural sensor sections (6A to 6E) are employed, each of the sensor signal receiving section (13) may be of a type operable to receive respective sensor signals from those plural sensor sections (6A to 6E), which are transmitted from the sensor signal transmitting sections (9A, 9B, 9), respectively, and the feed power transmitting section (12) may be provided in the sensor signal receiving unit (5, 5A) including the sensor signal receiving section (13). In the case of this construction, receipt of the sensor signals from the plural sensor sections (6A to 6E) and wireless transmission of the feed power can be carried out commonly by the sensor signal transmitting unit (5, 5A) and, therefore, the wireless sensor system as a whole can be simplified in structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 is a circuit section diagram showing the general structure of the wireless sensor system according to a third preferred embodiment of the present invention;

DETAILED DESCRIPTION OF THE EMBODIMENTS

A wireless sensor system according to a first preferred embodiment of the present invention will be described with particular reference to FIG. 1. This wireless sensor system includes a plurality of wireless sensor unit 4A and 4B, and a sensor signal receiving unit 5 for supplying by wireless an electric power to each of those wireless sensor units 4A and 4B and also for receiving by wireless sensor signals from the respective wireless sensor units 4A and 4B. The number of the wireless sensor units employed is not specifically limited to a particular number and one or more than two wireless sensor units may be employed, it being however to be noted that the use of the two wireless sensor units is shown in FIG. 1.

Each of the wireless sensor units 4A and 4B includes a sensor section 6A or 6B and a transmitting and receiving section 7A or 7B. Each of the sensor sections 6A and 6B defines means for detecting an object to be detected or detection object and at least one of a vibration sensor, a temperature sensor, a load sensor, a torque sensor and a preload sensor for detecting a preload on a bearing assembly is included in those plural sensor sections 6A and 6B. The remaining sensor sections 6A and 6B may be a revolution sensor. A sensor defining the revolution sensor may be of a Hall type sensor or a magnetic reluctance type sensor. Each of the transmitting and receiving sections 7A and 7B includes an electric power receiving section 8A or 8B and a sensor signal transmitting section 9A or 9B.

Figure 1:
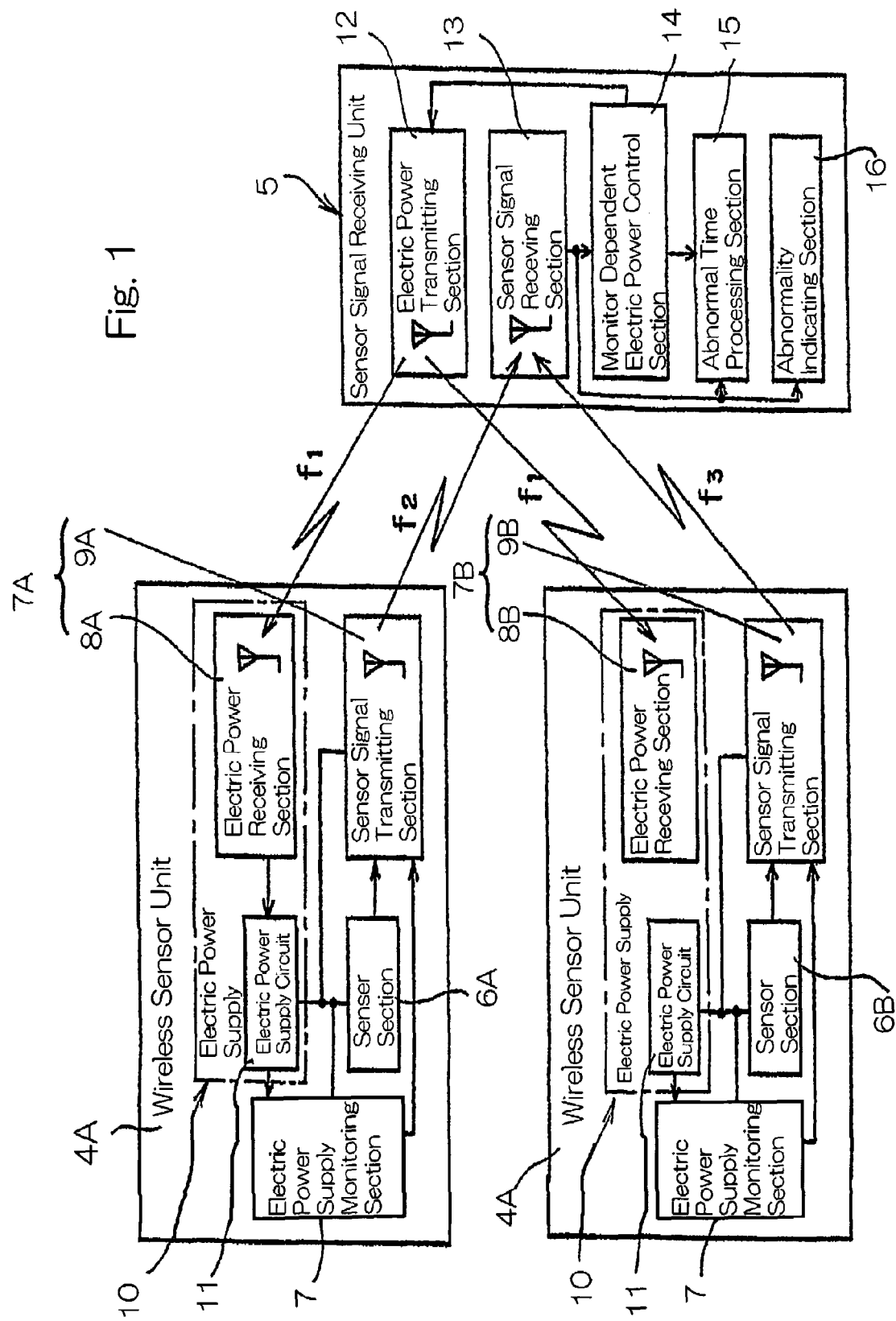
FIG. 1 is a circuit section block diagram showing a general structure of a wireless sensor system according to a first preferred embodiment of the present invention.

In the embodiment shown in FIG. 1, electric power supply sections 10 for supplying an electric driving power to the sensor sections 6A and 6B and the sensor signal transmitters 9A and 9B, and electric power supply monitoring sections 7 are additionally provided. The electric power supply sections 10 and the electric power supply monitoring sections 7 will be described later.

Figure 2:
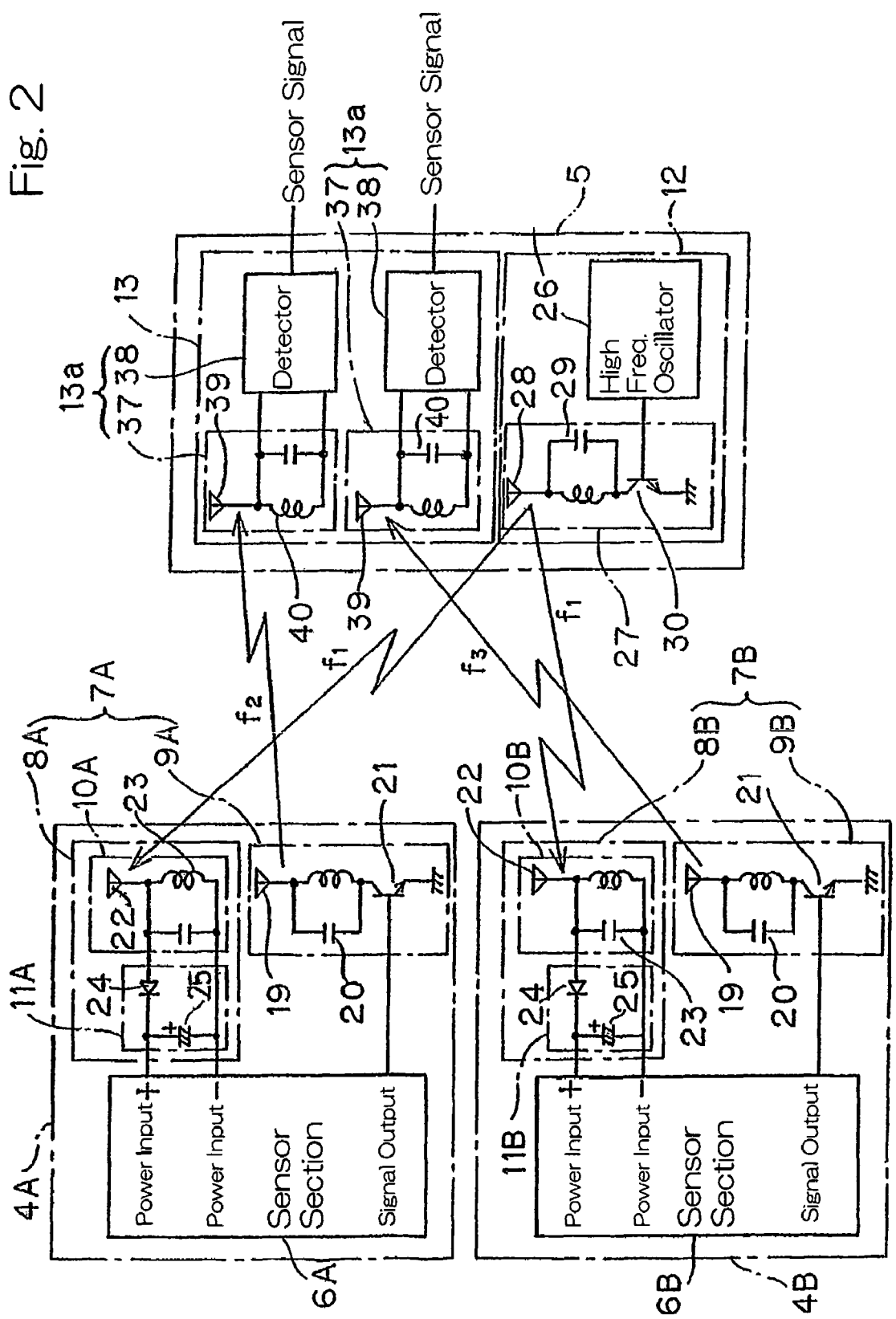
FIG. 2 is a circuit section diagram of the wireless sensor system shown in FIG. 1, showing a specific example of structure thereof.

As shown in FIG. 2, each of the electric power receiving sections 8A and 8B defines means for acquiring from an electromagnetic wave of a predetermined power supply frequency f1, an electric operating power through a respective tuning circuit 10A or 10B and a respective detecting and rectifying circuit 11A or 11B. The acquired electric operating power is utilized to drive the sensor sections 6A and 6B and the sensor signal transmitting sections 9A and 9B. Each of the electric power receiving sections 8A and 8B includes the tuning circuit 10A or 10B, made up of an antenna 22 and an LC circuit 23, and the detecting and rectifying circuit 11A or 11B made up of a diode 24 and a capacitor 25.

Each of the sensor signal transmitting sections 9A and 9B defines means for transmitting a signal, detected by the corresponding sensor section 6A or 6B, in the form of an electromagnetic wave sensor signal of a unique frequency f2 or f3 that is different from the power supply frequency f1. Each sensor signal transmitting section 9A or 9B includes an antenna 19, an LC circuit 20 and a semiconductor switching element 21.

The sensor signal receiving unit 5 includes a feed power transmitting section 12 which transmits an electromagnetic wave of the power supply frequency f1 and a sensor signal receiving section 13 capable of receiving wireless sensor signals of the respective natural frequencies f2 and f3 transmitted from the plural wireless sensor units 4A and 4B. The feed power transmitting section 12 in turn includes a high frequency oscillating section 26 and a transmitting section 27, which includes an antenna 28, an LC circuit 29 and a semiconductor switching element 30. The sensor signal receiving section 13 includes a plurality of, (for example, two, in the illustrated embodiment), receiving circuits 13a associated respectively with the wireless sensor units 4A and 4B. Each of the receiving circuits 13a is a receiving circuit for receiving a single frequency corresponding to each of the natural frequencies f2 and f3 transmitted from the respective wireless sensor units 4A and 4B and includes a tuning circuit 37 and a detecting section 38. Each tuning circuit 37 in turn includes an antenna 39 and an LC circuit 40.

According to the wireless sensor system of the above described construction, each of the wireless sensor units 4A and 4B is supplied by wireless with the electric operating power, neither a battery nor an electric generator is needed as a sensor operating electric power source and, therefore, the sensor system can be assembled compact in size and light-weight. Since no replacement of any battery is needed, the maintenance is easy to accomplish. Moreover, as the detection object, vibration, temperature, load, torque or preload on the bearing assembly can be detected. Also, since arrangement has been made that wireless reception of the wireless sensor signals and wireless supply of the electric power can be made from the common sensor signal receiving unit 5 to the plural wireless sensor units 4A and 4B, the wireless sensor system as a whole can have a simplified structure.

Figure 3:
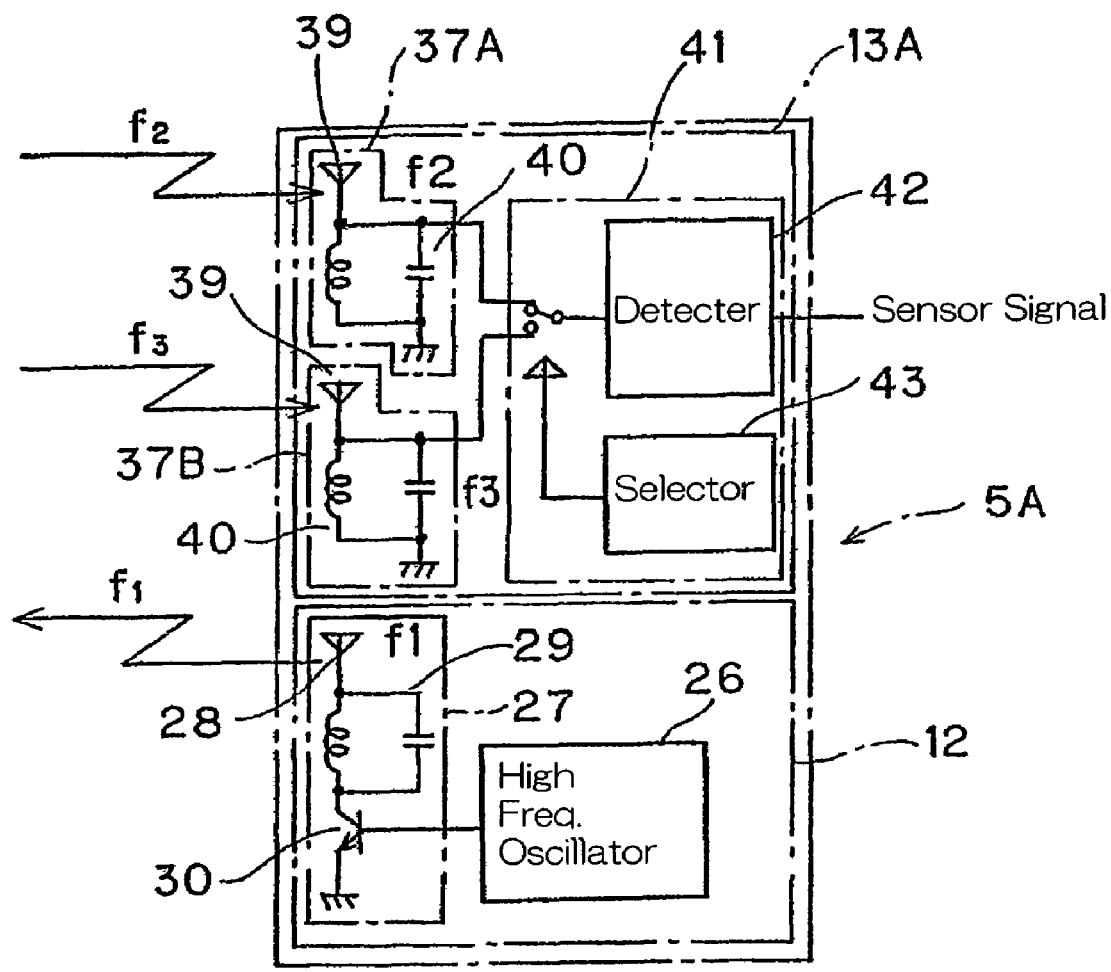
FIG. 3 is a circuit section diagram of a sensor signal receiving unit forming a part of the wireless sensor system according to a second preferred embodiment of the present invention.

FIG. 3 illustrates the structure of the sensor signal receiving unit 5A according to a second preferred embodiment of the present invention. This embodiment is such that in the first embodiment shown in FIG. 2, the sensor signal receiving unit 5A is so structured as shown therein. The same wireless sensor units as in the first embodiments are employed. In this embodiment, the sensor signal receiving section 13A of the sensor signal receiving unit 5A includes a plurality of tuning circuits 37A and 37B of a single frequency corresponding to each of the natural frequencies f2 and f3 transmitted from the respective wireless sensor units 4A and 4B (FIG. 2) and a single switching detector section 41 for detecting respective outputs from the tuning circuits 37A and 37B on a time sharing basis. The switching detector section 41 is made up of a detector 42 and a selector 43 for selecting one of the tuning circuits 37A and 37B on a time sharing basis and then connecting it to the detector 42. Other structural features than those mentioned above are identical with those employed in the sensor signal receiving unit 5 in the previously described first embodiment.

In the case of this embodiment, when the selector 43 of the switching detector section 41 is held in position to connect the tuning circuit 37A with the detector 42, the signal of the frequency f2 fed from the wireless sensor unit 4A, employed to detect the number of revolutions, and then received by the tuning circuit 37A is detected by the detector 42. On the other hand, when the selector 43 of the switching detector section 41 is held in position to connect the tuning circuit 37B with the detector 42, the signal of the frequency f3 fed from the wireless sensor unit 4B and then received by the tuning circuit 37B is detected by the detector 42.

In the case of this embodiment, the electromagnetic waves of the natural frequencies f2 and f3 transmitted from the plurality of, (two, in the illustrated embodiment), the wireless sensor units 4A and 4B, respectively, can be separately detected selectively one at a time by the single detector 42 in the sensor signal receiving unit 5A and, therefore, the structure of the sensor signal receiving unit 5A can be simplified even where the number of the wireless sensor units is large.

It is to be noted that in the embodiment shown in FIG. 3, instead of the use of the plural tuning circuits 37A and 37B, a single tuning circuit capable of changing a tuning frequency in correspondence with the unique frequency transmitted from each of the wireless sensor units 4A and 4B (FIG. 2) may be employed. In such case, the sensor signal receiving section 13A has to be so configured that the unique frequency of the variable tuning circuit be selected on a time sharing basis by a selector and be then detected by the detector 42.

Figure 4:
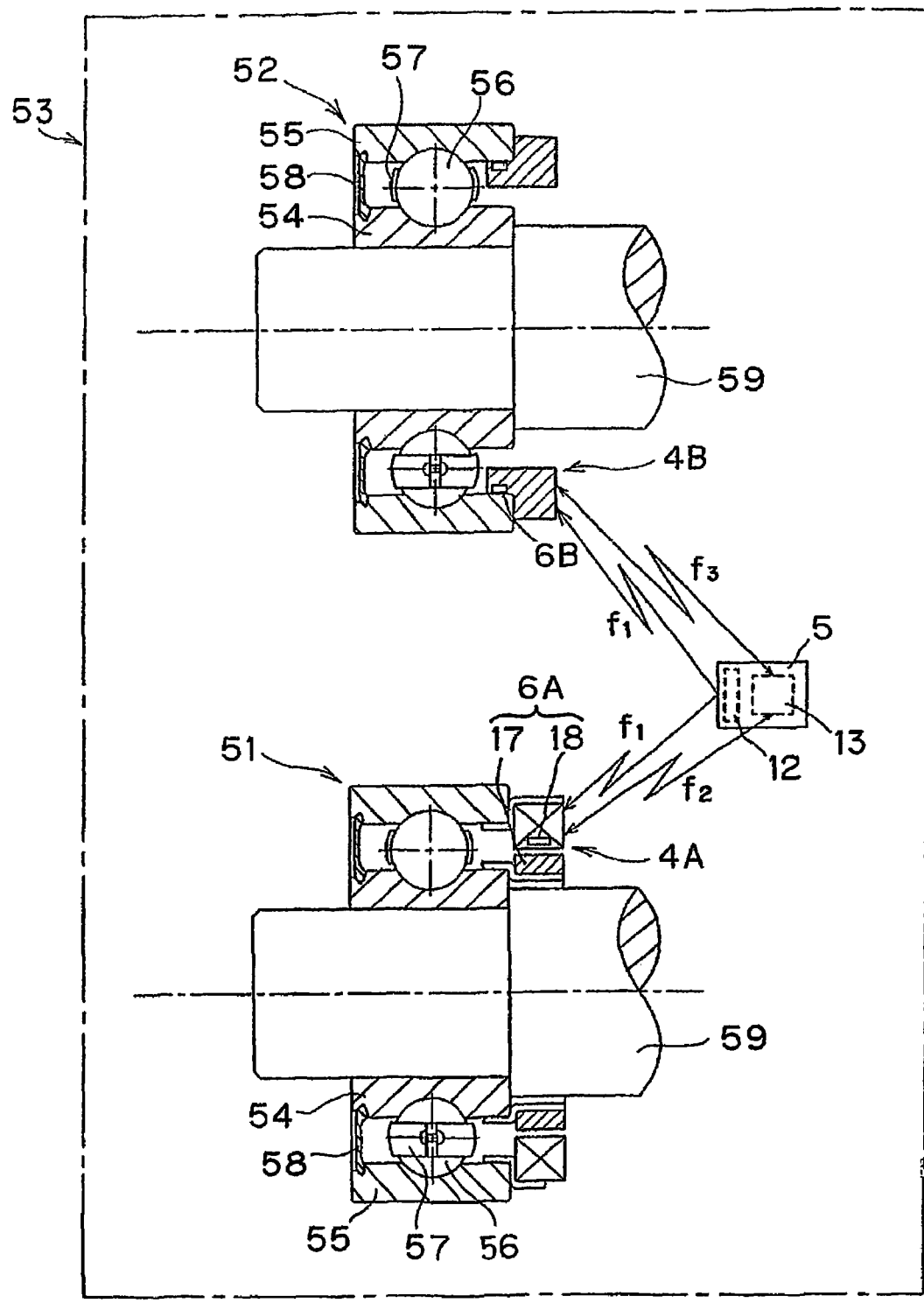
FIG. 4 is a longitudinal sectional view of the machine setup equipped with and operatively linked with each other through the wireless sensor system according to the first preferred embodiment of the present invention.

In the next place, application of the wireless sensor system according to the first embodiment to the machine setup will be described in detail with particular reference to FIG. 4. In this example, the machine setup 53 includes a plurality of rolling bearing assemblies 51 and 52, which are equipped with the respective wireless sensor units 4A and 4B shown and described in connection with any one of the embodiments of FIGS. 1 and 2. The machine setup 53 is in the form of, for example, a conveyor line including, for example, roller conveyors or belt conveyors, in which rotary shafts 59, each forming a shaft for transport rollers or belt drive rollers, are rotatably supported respectively by the rolling bearing assemblies 51 and 52. Each of the rolling bearing assemblies 51 and 52 is of a type including a circular row of rolling elements 56 interposed between an inner race 54 and an outer race 55 and provided with a sealing member 58 and is in the form of a deep groove ball bearing assembly or the like. The rolling elements 56 in each of the rolling bearing assemblies 51 and 52 are retained by a retainer 57.

The wireless sensor unit 4A mounted in the rolling bearing assembly 51 is used for the detection of the number of revolutions, which includes the sensor section 6A made up of a magnetic encoder 17, mounted on the inner race 54, and a magnetic sensor 18 such as, for example, a Hall sensor or MR sensor mounted on the outer race 55 in face-to-face relation with the magnetic encoder 17. The wireless sensor unit 4B mounted in the other rolling bearing assembly 52 includes the sensor section 6B used to detect a detection object of the bearing assembly 52 other than the number of revolutions, for example, temperature or vibration. The sensor section 6B is mounted on one of the inner race 54 and the outer race 55, which serves as a stationary race member (the outer race 55 in the illustrated embodiment). The sensor section 6B may be a sensor for detecting a load, torque or preload on the bearing assembly other than that described above.

Figure 5:
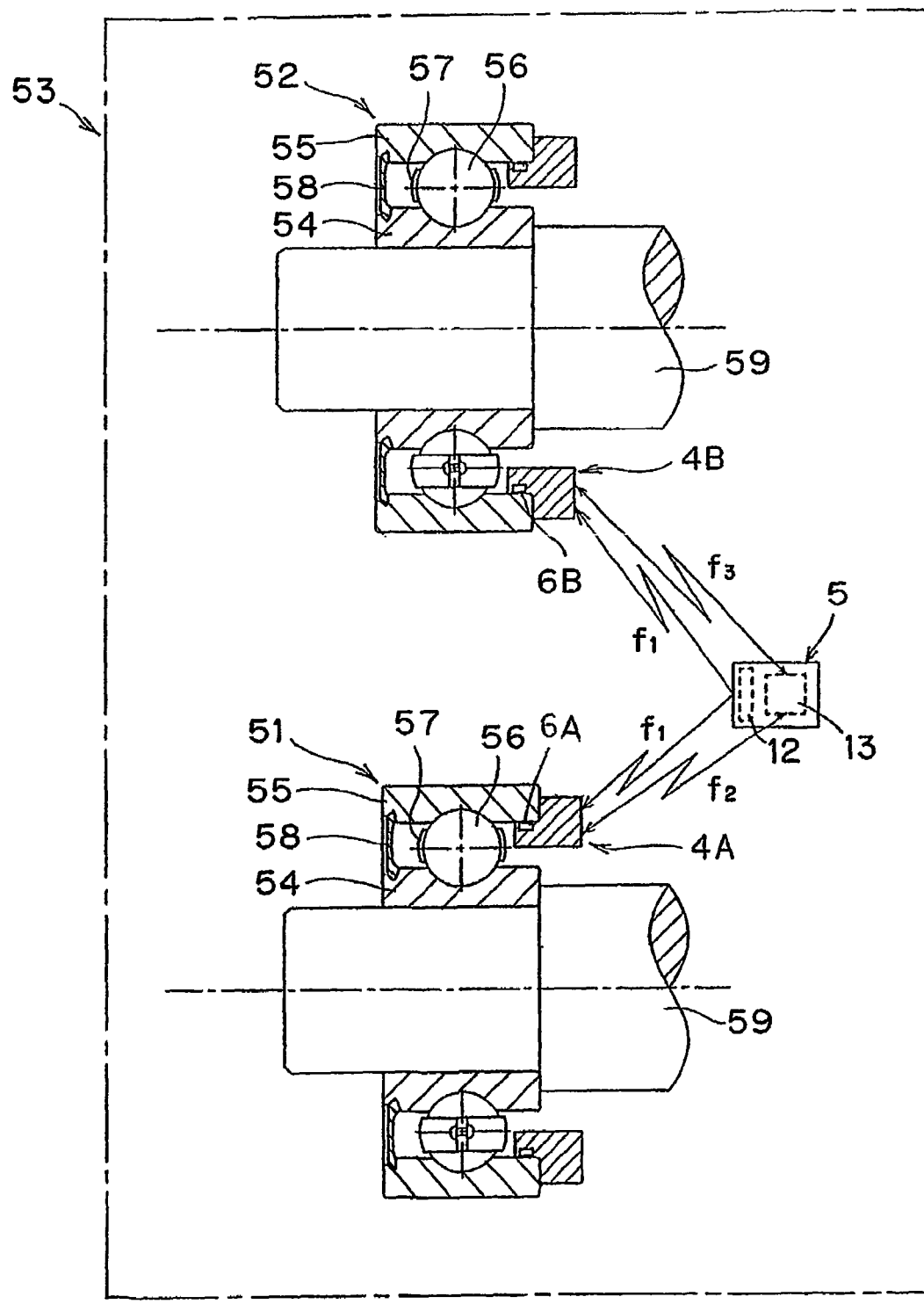
FIG. 5 is a longitudinal sectional view of the different machine setup equipped with and operatively linked with each other through the wireless sensor system according to the first embodiment of the present invention.

Also, instead of the sensor section 6A in the rolling bearing assembly 51 being used as a revolution sensor to detect the number of revolutions, any of the sensor sections 6A and 6B may be used as one of a vibration sensor, a temperature sensor, a preload sensor, a torque sensor or a preload sensor for the detection of a preload on the bearing assemblies 51 and 52 as shown in FIG. 5.

In the machine setup 53, the sensor signal receiving unit 5 is disposed at any suitable site convenient to receive sensor signals from each of the wireless sensor units 4A and 4B provided in the respective bearing assemblies 51 and 52, and also to transmit the electric operating power to each of the wireless sensor units 4A and 4B. In this illustrated embodiment, the construction is identical with that according to any one of the embodiments shown respectively in FIGS. 1 and 2, unless otherwise specified.

In the case of this construction, in the plural rolling bearing assemblies 51 and 52 in the machine setup 53, respective sensor signals detected through the wireless sensor units 4A and 4B can be received by the common sensor signal receiving unit 5 and, also, the electric power can be supplied from the common sensor signal receiving unit 5 to both of the wireless sensor units 4A and 4B.

In the embodiment shown therein, although reference has been made to the use of the two wireless sensor units 4A and 4B, each wireless sensor unit may be disposed in three or more rolling bearing assemblies in the machine setup 53, with the common sensor signal receiving unit 5 allowed to receive the respective sensor signals and to supply the electric power by wireless.

Figure 6:
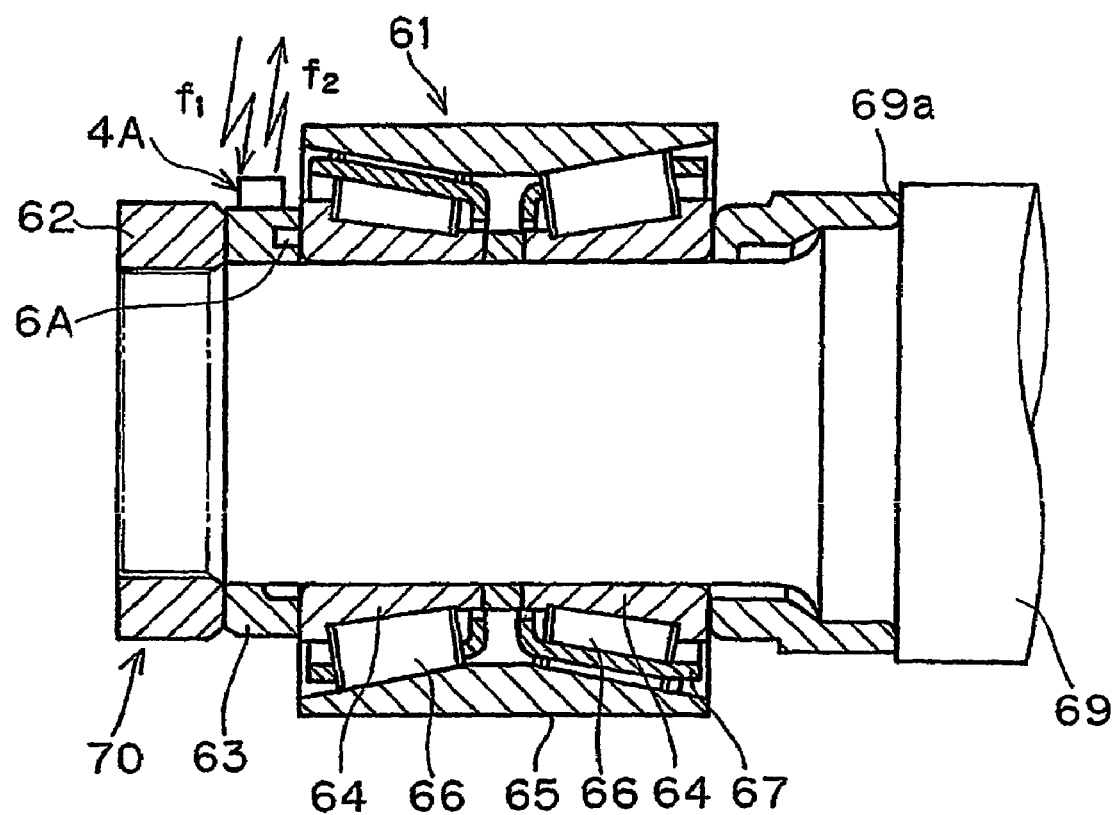
FIG. 6 is a longitudinal sectional view of a bearing assembly equipped with a component of the wireless sensor system according to the first embodiment of the present invention.

FIG. 6 illustrates an example of a bearing assembly equipped with the wireless sensor of a kind employing a preload sensor as any one of the sensor sections 6A or 6B. This bearing assembly 61 is in the form of a rolling bearing assembly including a circular row of rolling elements 66 interposed between an inner race 64 and an outer race 65 and is preloaded by a preloading means 70. The rolling elements 66 are retained by a retainer 67. This bearing assembly 61 is in the form of a dual row tapered roller bearing assembly having the inner race 64 mounted on a shaft 69. The preloading means 70 urges the inner race 64, situated between an inner race spacer 63 and a shoulder 69a of the shaft 69, in a direction axially of the inner race 64 by means of a nut 62 threadingly mounted on an externally threaded portion of the shaft 69, to thereby apply a preload to the bearing assembly 61. The sensor section 6A in the form of a preload sensor for detecting the preload on the bearing assembly is mounted on the inner race spacer 63. This sensor section 6A is the one provided in the wireless sensor unit 4A in the wireless sensor system in, for example, the embodiment shown in FIG. 1. The preload sensor referred to above includes a load sensor utilizing, for example, a piezoelectric element or a load sensor of a magnetostrictive type and is operable to detect an axial load acting axially on the inner race spacer 63.

It is to be noted that although in this embodiment the inner race 64 serves as a rotating member with the wireless sensor unit 4A mounted on the rotatable spacer 63, the inner race 64 may serve as a stationary member. Also, the wireless sensor unit 4A and its sensor section 6A may be mounted on a spacer (not shown) on the side of the outer race 65. Yet, the sensor section 6A may be mounted on a spacer positioned between the inner races.

Another application of the wireless sensor system according to this embodiment to an automotive vehicle will now be described with particular reference to FIG. 7. The wheel support bearing assembly 33 includes dual rows of rolling elements 3 interposed between an outer member 1, serving as a stationary member, and an inner member 2 serving as a rotatable member. The outer member 1 is supported by a suspension, protruding downwardly from an vehicle body 34, through a knuckle (not shown). The inner member 2 is made up of a hub axle 2A and an inner race segment 2B mounted coaxially on one end of the hub axle 2A, with respective raceways defined in the hub axle 2A and the inner race segment 2B. The outer member 1 is of one-piece construction and has raceways defined therein in alignment of the raceways in the inner member 2. The hub axle 2A is coupled with a shaft portion provided in an outer race 15a of a constant velocity universal joint 15, with the inner member 2 and the outer race 15a of the constant velocity universal joint consequently coupled together. It is to be noted that this wheel support bearing assembly 33 is of a third generation type.

The plural wireless sensor units 4A and 4B are mounted on the outer member 1 of this wheel support bearing assembly 33. For example, the wireless sensor unit 4A including the sensor section 6A operable to detect the number of revolutions of a vehicle wheel 31 is disposed within one end of an annular bearing space delimited between the outer member 1 and the inner member 2. The other wireless sensor unit 4B mounted on the outer member 1 includes the sensor section 6B that is rendered to be a vibration sensor or a temperature sensor. The sensor section 6B may be, other than that described above, a load sensor, a torque sensor or a preload sensor. The sensor signal receiving unit 5 for supplying an electric power by wireless to each of the wireless sensor units 4A and 4B and also for receiving respective sensor signals from the wireless sensor units 4A and 4B is accommodated within, for example, a tire housing 34a of the vehicle body 34. The wireless sensor units 4A and 4B are of a structure identical with those shown in and described with reference of any one of FIGS. 1 and 2. The sensor signal receiving unit 5 may be either the one shown in and described with reference to FIG. 2 or the one shown in and described with reference to FIG. 3.

The sensor section 6A of the wireless sensor unit 4A, which is used for the detection of the number of revolutions, includes a magnetic encoder 17, mounted on the inner member 2, and a magnetic sensor 18 mounted on the outer member 1 in face-to-face relation with the magnetic encoder 17. The magnetic encoder 17 is secured to a slinger forming a part of a sealing structure mounted on the inner member 2. The magnetic encoder 17 includes a multipolar magnet having a plurality of magnetic poles N and S alternating in a direction circumferentially thereof. On the other hand, this magnetic sensor 18 is in the form of a magnetic sensor such as, for example, a Hall sensor or an MR sensor and is operable to detect a change in magnetic polarity of the magnetic encoder 17 resulting from revolution of the vehicle wheel 31 and then output, as the sensor signal, an incremental pulse signal indicative of such change in magnetic polarity.

The sensor section 6B of the other wireless sensor unit 4B includes a temperature sensor in the form of, for example, a thermocouple or a vibration sensor of a type utilizing a piezoelectric element or the like.

Hereinafter, the operation will be described. Power supply electromagnetic waves transmitted from the feed power transmitting section 12 (FIG. 1) of the sensor signal receiving unit 5 mounted on the vehicle body 34 are detected and rectified by the electric power receiving section 8A and 8B (FIG. 1) of the wireless sensor units 4A and 4B to thereby provide the wireless sensor units 4A and 4B with electric driving powers.

In the wireless sensor units 4A and 4B mounted on the wheel support bearing assembly 33, the number of revolutions of the vehicle wheel is detected by the sensor section 6A and, on the other hand, the temperature or vibration of the wheel support bearing assembly, or the load, torque or preload acting on the wheel support bearing assembly is detected by the sensor section 6B. The sensor signals so detected are transmitted by wireless to the sensor signal receiving unit 5. Specifically, the sensor signals so detected are transmitted by the sensor signal transmitting section 9A (FIG. 1) by wireless in the form of a carrier wave comprised of electromagnetic waves of the frequency f2. The electromagnetic waves are then received and detected by one of the receiving circuits in the sensor signal receiving section 13 (FIG. 1) of the sensor signal receiving unit 5, which has a frequency corresponding thereto and which subsequently outputs a detection signal indicative of the number of revolutions of the vehicle wheel, a signal indicative of the temperature, vibration or load, or a signal indicative of the load, torque or preload. The number of revolutions of the vehicle wheel is utilized for the control of an ABS system, and the detection signal indicative of the temperature, vibration or preload is utilized for the detection of the presence or absence of any abnormality in the wheel support bearing assembly 33 and/or for the maintenance of the status. On the other hand, the detection signal indicative of the load or torque is utilized for the control of the running attitude of the automotive vehicle.

As hereinabove described, since in this wireless sensor system, the electric power is supplied by wireless in the form of the electromagnetic wave from the sensor signal receiving unit 5, mounted on the vehicle body 34, to each of the wireless sensor units 4A and 4B and, also, the sensor signals transmitted in the form of the electromagnetic waves from the wireless sensor units 4A and 4B are received by the sensor signal receiving unit 5, there is no problem associated with run-out of the battery that is encountered in the conventional example utilizing the battery as a power source. Also, each of the detected sensor signals can be assuredly transmitted in the form of a wireless signal and each of the sensor sections 6A and 6B of the respective wireless sensor units 4A and 4B can be compactly and inexpensively manufactured. Since no battery replacement is required, the maintenance can be accomplished easily.

Also, unlike a self-generation type, operation of the sensor sections 6A and 6B and transmission of the sensor signals can be performed even during rotation of the vehicle wheel at an extremely low speed approximating to a halt. It is to be noted that the wireless sensor units 4A and 4B may be arranged within the bearing assembly that is sealed with the sealing member. Also, only the sensor sections 6A and 6B may be inserted inside the bearing assembly.

Figure 8:
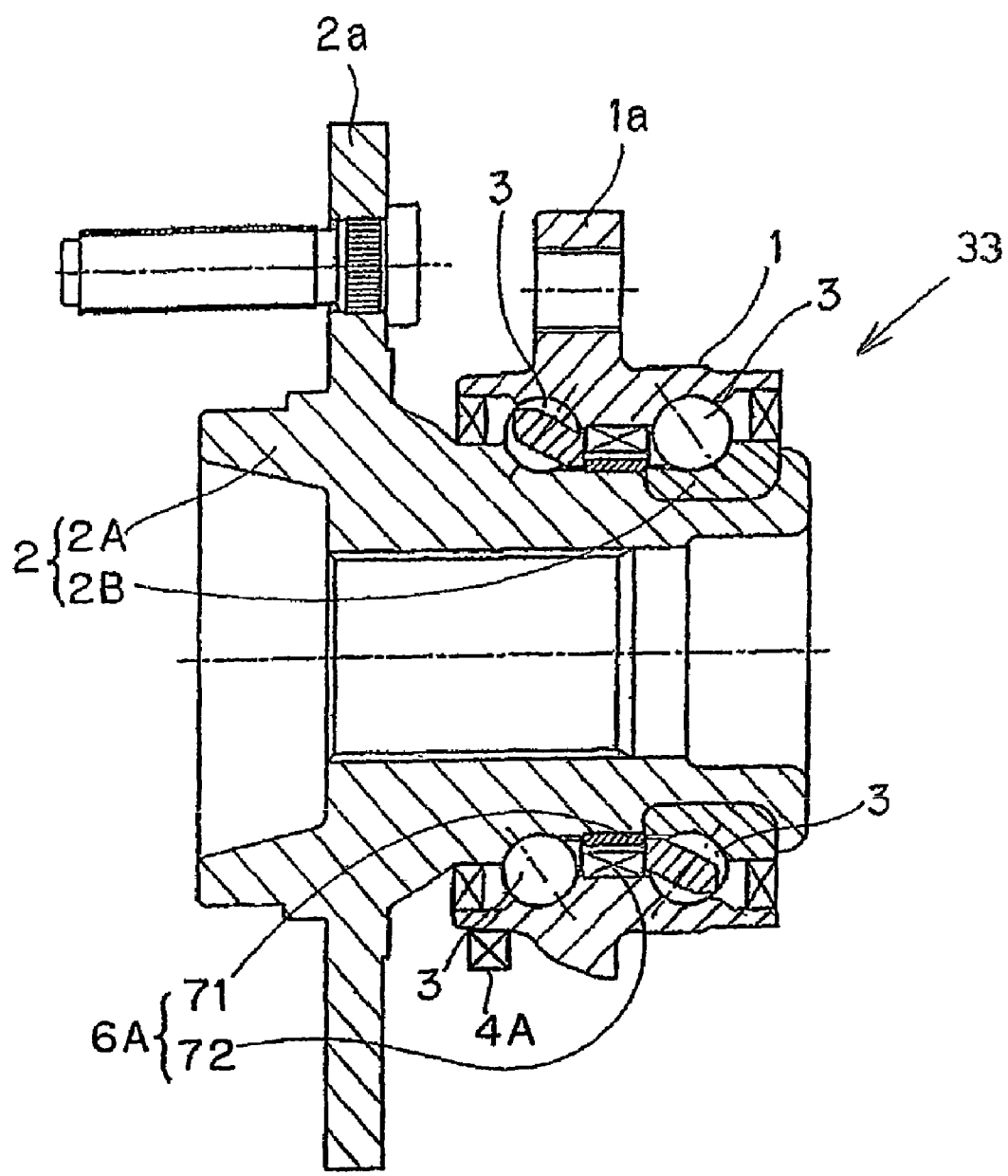
FIG. 8 is a longitudinal sectional view of a different wheel support bearing assembly equipped with the component of the wireless sensor system according to the first embodiment of the present invention.
Figure 9A:
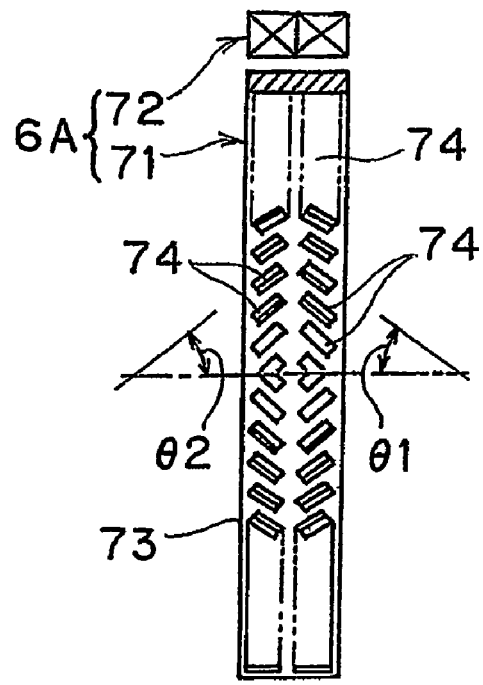
FIG. 9A is a side view, with a portion cut out, of a torque sensor defining a sensor section forming a part of the wireless sensor system.
Figure 9B:
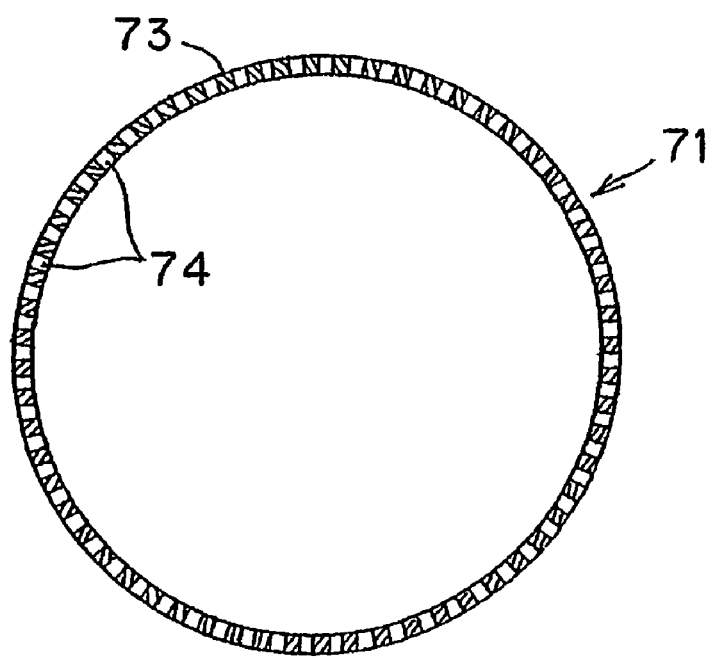
FIG. 9B is a transverse sectional view of a magnetostrictive member of the sensor section shown in FIG. 9A.

FIG. 8 illustrates another example of the wheel support bearing assembly 33. In this example, the sensor section 6A provided in the wireless sensor unit 4A is employed as a torque sensor. The sensor section 6A serving as the torque sensor includes a to-be-detected member 71, mounted externally on the inner member 2 and made of a magnetostrictive material, and a torque detecting member 72 mounted on the outer member 2 in correspondence with the to-be-detected member 71. The torque detecting member 72 is operable to detect a change in magnetic characteristic of the to-be-detected member 71 to thereby detect the torque acting on a drive shaft fitted to the inner member 2. As the magnetostrictive material for the to-be-detected member 71, an alloy of iron and aluminum or the like is suitably employed. The torque detecting member 72 is in the form of a coil fitted to the outer member 1 so as to encircle the to-be-detected member 71. The to-be-detected member 71 includes, for example, as shown in FIG. 9, a cylindrical body 73, made of a magnetostrictive material, and circumferentially juxtaposed two rows of inclined grooves 74 that are inclined at respective predetermined angles $\theta 1$ and $\theta 2$ relative to the axial direction. The respective angles $\theta 1$ and $\theta 2$ of inclination of the inclined grooves 74 of the two rows lie in a sense opposite to each other. The provision of the inclined grooves 74 is effective to increase the sensitivity and the design, in which the respective angles $\theta 1$ and $\theta 2$ of inclination are chosen to lie in a sense opposite to each other, is effective to provide not only an indication of the magnitude of the torsional torque acting on the shaft, but also an indication of the direction thereof In such case, an output from the coil of the torque detecting member 72 is processed by a detecting circuit (not shown) and is then transmitted by wireless from the sensor signal transmitting section 9A (FIG. 1) of the wireless sensor unit 4A.

It is to be noted that although the wireless sensor unit 4A employed in the example shown in FIG. 8 is the one employed in the wireless sensor system in, for example, any one of the embodiments shown in FIGS. 1 and 2, the other wireless sensor unit 4B (not shown in FIG. 8) may be arranged in this wheel support bearing assembly 33 with the sensor section 6B thereof used as a sensor for detecting the detection object such as the vibration, temperature, load or preload.

FIG. 10 illustrates a third preferred embodiment of the present invention. The wireless sensor system according to this embodiment makes use of the only wireless sensor unit 4 and this only wireless sensor unit 4 is provided with a plurality of sensor sections 6C to 6E. The wireless sensor unit 4 includes, in addition to the plural sensor sections 6C to 6E, a sensor signal transmitting section 9 and an electric power receiving section 8. The sensor signal transmitting section 9 is used to transmit respective sensor signals of the plural sensor sections 6C to 6E. The respective outputs from those plural sensor sections 6C to 6E are processed by a signal coordinating section 60 so as to be capable of being transmitted from the sensor signal transmitting section 9. This signal coordinating section 60 may be of any suitable circuit design, provided that the respective sensor signals from the sensor sections 6C to 6E can be processed so as to be discriminately received by the receiving side and may, for example, be so designed that the respective sensor signals from the sensor sections 6C to 6E can be supplied to the sensor signal transmitting section 9 on a time-shared basis. Alternatively, the signal coordinating section 60 may be of a type capable of superimposing the respective sensor signals from the sensor sections 6C to 6E. The signal coordinating section 60 may be either incorporated in the sensor signal transmitting section 9 as a part thereof or separate from the sensor signal transmitting section 9. The electric power receiving section 8 is operable to supply an electric power, received thereby, to the sensor sections 6C to 6E, the sensor signal transmitting section 9 and the signal coordinating section 60. The sensor signal transmitting section 9, the electric power receiving section 8 and the signal coordinating section 60 altogether constitute a sensor signal transmitting section 7.

The sensor signal receiving unit 5 includes a sensor signal receiving section 13 for receiving the sensor signal, transmitted by wireless from the sensor signal transmitting section 9 of the wireless sensor unit 4, and an feed power transmitting section 12 for transmitting an electric power by wireless to the electric power receiving section 8 of the wireless sensor unit 4. The sensor signal receiving section 13 is of a type capable of discriminately receiving the respective sensor signals, outputted from the sensor sections 6C to 6E and transmitted through the sensor signal transmitting section 9 of the wireless sensor unit 4, in dependence on a processing scheme of the signal coordinating section 60. Transmission of the signals between the sensor signal transmitting section 9 and the sensor signal receiving section 13 and transmission of the electric power between the feed power transmitting section 12 and the electric power receiving section 8 are carried out by wireless by means of, for example, electromagnetic waves.

The sensor sections 6C to 6E may be utilized either to detect the same detection objects (for example, the temperatures) or to detect different detection objects, for example, the number of revolutions, the temperature and the vibration.

It is also to be noted that one of the wireless sensor units 4A and 4B employed in the first embodiment as shown in FIG. 1 may be of a design including the plural sensor sections 6C to 6E as shown in FIG. 10. In such case, the use is preferred of the signal coordinating section 60.

Figure 11:
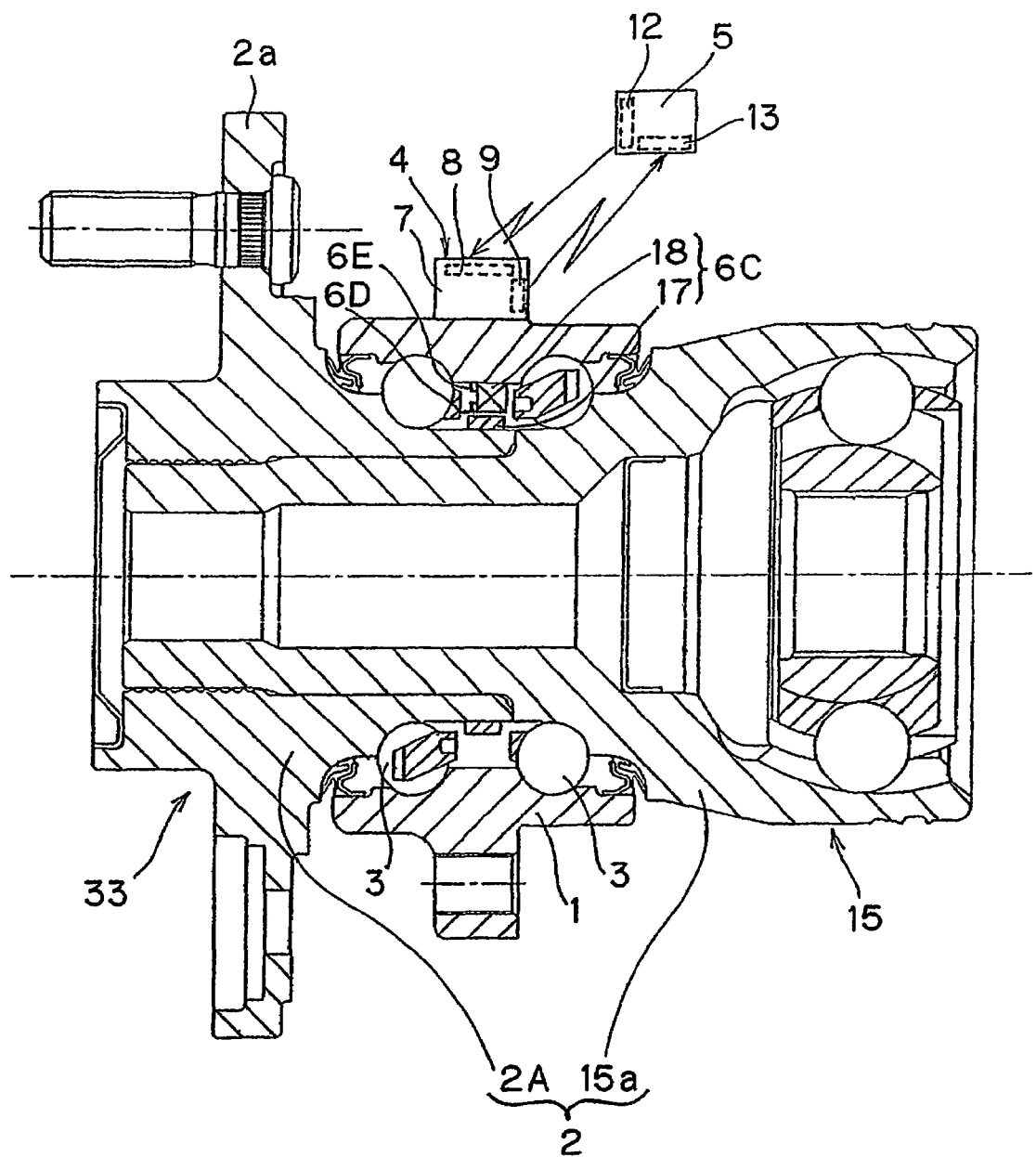
FIG. 11 is a longitudinal sectional view of the wheel support bearing assembly to which the wireless sensor system shown in FIG. 10 is applied.

FIG. 11 illustrates an application of the wireless sensor system according to the third embodiment shown in and described with reference to FIG. 10 to the wheel support bearing assembly 33, in which the wireless sensor unit 4 is mounted on the outer member 1. In this example, the plural sensor sections 6C to 6E are used to detect the number of revolutions, the temperature and the vibration, respectively. As the sensor sections 6D and 6E, a preload sensor, a load sensor and a torque sensor may be provided in place of the above.

The sensor section 6C serving as a revolution sensor includes a magnetic encoder 17 containing a multipolar magnet mounted externally on the inner member 2 and a magnetic sensor 18 in the form of, for example, a Hall sensor or an MR sensor mounted internally on the outer member 1 in face-to-face relation with the magnetic encoder 17. The transmitting and receiving unit 7 is mounted externally on the outer member 1. This transmitting and receiving unit 7 has circuit elements accommodated within a box and is electrically connected with the sensor sections 6C to 6E by means of wiring (not shown).

The wheel support bearing assembly 33 shown therein is of a fourth generation type, in which the inner member 2 is made up of a hub axle 2A and an outer race 15a of the constant velocity universal joint 15 and respective raceways on the inner member 2 for the dual rows of the rolling elements are defined in the hub axle 2A and the outer race 15a of the constant velocity universal joint 15, respectively. Other structural features of the wheel support bearing assembly 33 than those described above are identical with those of the wheel support bearing assembly 33 of the third generation type shown in and described with reference to FIG. 7. It is, however, to be noted that in the example shown in FIG. 11, the wheel support bearing assembly 33 may be rendered to be of a third generation type such as shown in, for example, FIG. 7.

In the case of this construction, mounting of the only wireless sensor unit 4 on the wheel support bearing assembly 33 is sufficient to accomplish the detection of the number of revolutions of the vehicle wheel, the temperature and the vibration. Also, the wireless sensor unit 4 can be supplied an electric power by wireless and the wiring system can therefore be simplified.

Figure 12:
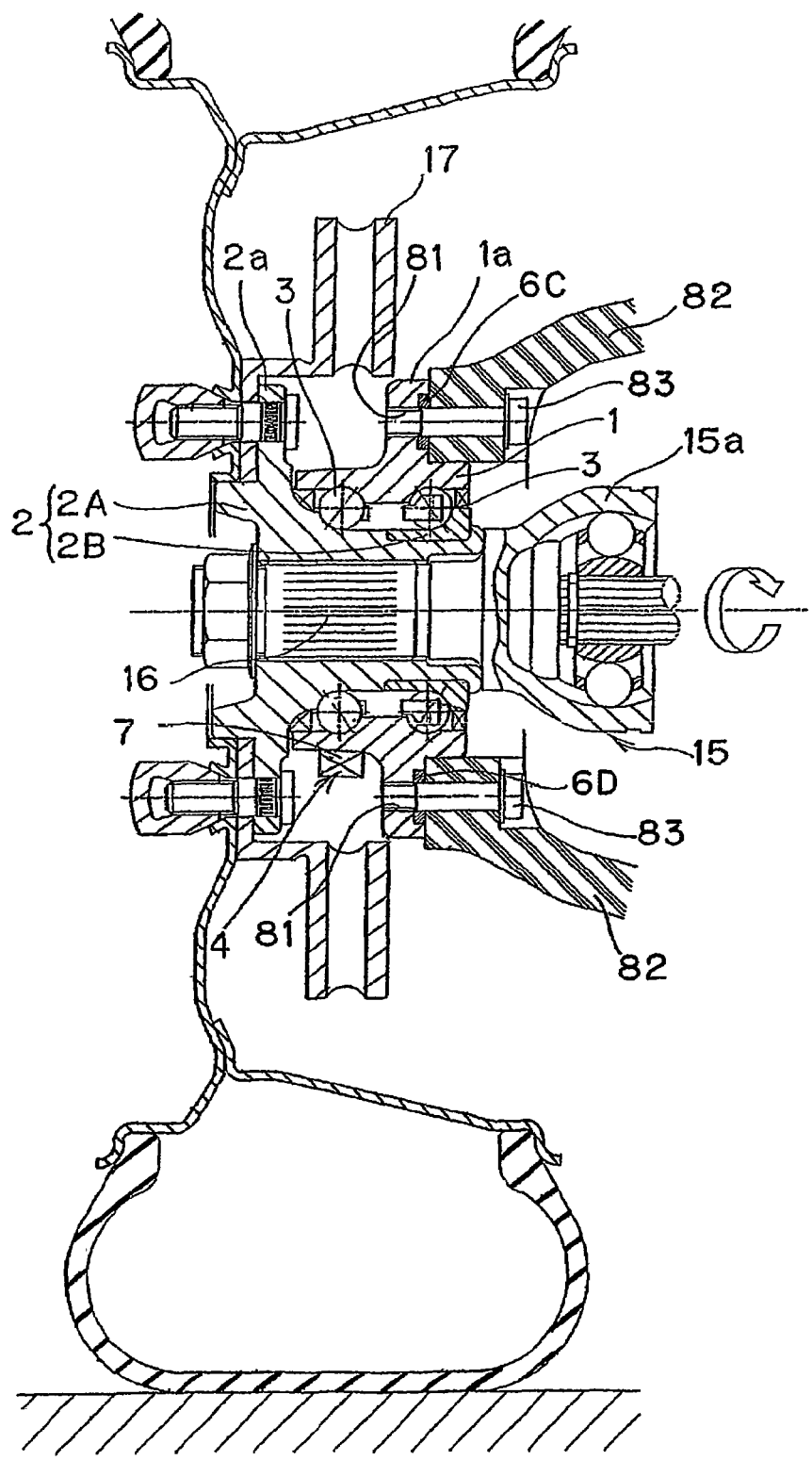
FIG. 12 is a longitudinal sectional view of the different wheel support bearing assembly to which the wireless sensor system shown in FIG. 10 is applied.

FIG. 12 illustrates an another application of the wireless sensor system according to the embodiment shown in FIG. 10 to the wheel support bearing assembly 33. In this example, the plural sensor sections 6C and 6D of the wireless sensor unit 4 are employed in the form of sensors capable of detecting the same detection objects and, hence, in the form of load sensors. The sensor sections 6C and 6D forming the load sensors are provided in the neighborhood of respective bolt insertion holes 81 defined in a flange 1a integrated with the outer member 1. The bolt insertion holes 81 are those through which associated bolts 83 required to secure the outer member 1 to the knuckle 82 are inserted. The plural sensor sections 6C and 6D are disposed in the corresponding bolt insertion holes 81 at respective location spaced up and down or left and right with respect to, for example, the longitudinal axis of the bearing assembly. The sensor sections 6C and 6D each forming the load sensor are of a type utilizing a magnetostrictive element or a piezoelectric element as a load sensing element having an electric characteristic that varies in dependence on the load.

The sensor sections 6C and 6D are connected by wiring (not shown) with the transmitting and receiving unit 7 mounted externally on the outer member. The transmitting and receiving unit 7 has circuit elements accommodated within a box as is the case with that described hereinabove.

It is to be noted that although in FIG. 12, reference has been made to the use of the two sensor sections 6C and 6D, a number of sensor sections equal to the number of bolt insertion holes 81 may be employed. Also, the sensor signal receiving unit 5, although not shown in FIG. 12, is disposed inside a tire housing in a manner similar to that described in connection with the example of FIG. 7.

Figure 7:
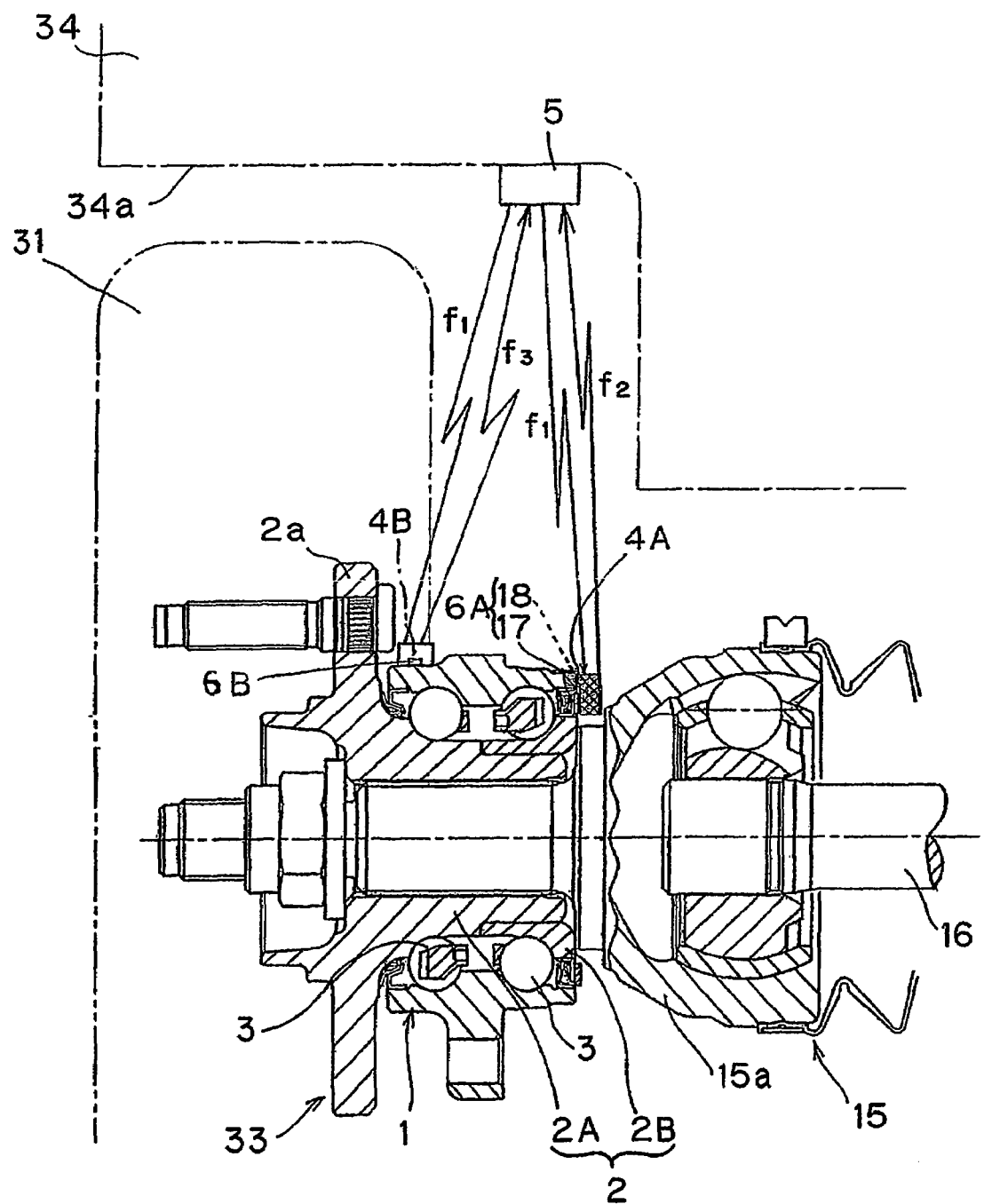
FIG. 7 is a longitudinal sectional view of a wheel support bearing assembly equipped with a component of the wireless sensor system according to the first embodiment of the present invention.

In the case of this construction, the sensor signals, or detected load signals, indicative of the loads detected respectively by the sensor sections 6C and 6D can be transmitted from the sensor signal transmitting section 9 (FIG. 1) of the wireless sensor unit 4 and are subsequently received by the sensor signal receiving section 13 (FIG. 1) of the sensor signal receiving unit 5 (FIG. 7). In reference to the values of the loads at the associated bolt insertion holes, which have been so received, the magnitude of the load acting on the outer member 1 of the wheel support bearing assembly 33 can be detected and, since the plural sensor sections 6C and 6D are disposed having been spaced a distance from each other, the inclination of the direction in which the load acts can also be detected. Accordingly, the status of load on the vehicle wheel during run of the automotive vehicle along an inclined road surface or during curving of the automotive vehicle can be detected and, hence, the respective signals from the plural load sensors can be used as information required to control, for example, the attitude of the automotive vehicle. Also, the electric operating power necessary to electrically power the sensor sections 6C and 6D, which forms the load sensors, and the sensor signal transmitting section 9 (FIG. 1) can be supplied by wireless in a manner similar to that in any one of the foregoing embodiments, thereby eliminating the necessity of the wiring system.

It is to be noted that although in any one of the foregoing embodiments, reference has been made to the use of the only sensor signal receiving unit 5, a plurality of sensor signal receiving units 5 may be employed. Where the plural sensor signal receiving units are employed, each of those sensor signal receiving units 5 may be so designed as to receive the sensor signals from the sensor signal transmitting sections of the same wireless sensor unit or to receive the sensor signals from the sensor signal transmitting sections of the different wireless sensor units. Also, the sensor signal receiving section and the feed power transmitting section may not be necessarily provided in the same sensor signal receiving unit 5, but may be disposed having been spaced from each other. Yet, reception of the sensor signals may be carried out by means of separate sensor signal receivers and the electric power may be supplied by wireless to the plural wireless sensor units from the same feed power transmitting section 12.

Also, although in any one of the foregoing embodiments, the wireless transmission and reception have been described as performed using electromagnetic waves, the present invention is satisfactorily provided that both of the sensor signals and the electric operating power can be transmitted or received by wireless and, accordingly, transmission and reception may be carried out by the use of electromagnetic coupling, optical beams and/or ultrasonic waves.

The electric power supply section 10 of each of the wireless sensor units 4A and 4B shown in FIG. 1 includes an electric power receiving section 8A or 8B for receiving a corresponding electric driving power, transmitted by wireless, and an electric power supply circuit 11 for supplying the electric power so received to the sensor section 6A or 6B and the associated sensor signal transmitting section 9A or 9B. Where each electric power receiving section 8A and 8B is of a type in which supply of the electric power by wireless is carried out by the utilization of electromagnetic wave, it is made up of a tuning circuit or the like. In such case, the electric power supply circuit 11 is made up of a detecting and rectifying circuit or the like. The electric power supply circuit 11 may be of a type provided with a secondary battery or capacitor for accumulating the received electric power and a charging circuit therefore.

The sensor signal receiving unit 5 includes a sensor signal receiving section 13 for discriminately receiving the sensor signals, transmitted by wireless from the respective sensor signal transmitting sections 9A and 9B of the wireless sensor units 4A and 4B, and an feed power transmitting section 12 for transmitting an electric power by wireless to the respective electric power receiving sections 8A and 8B of the wireless sensor units 4A and 4B.

Transmission and reception between the sensor signal transmitting sections 9A and 9B and the sensor signal receiving section 13, and transmission and reception between the feed power transmitting section 12 and the electric power receiving sections 8A and 8B may be carried out by the use of electromagnetic waves, light waves, infrared beams, ultrasonic waves or magnetic coupling.

Each of the sensor signals transmitted by wireless has a frequency different from that of the feed electric power and, also, the plural sensor signals have their own frequencies distinct from each other. In this example, the frequency of the feed electric power is designated by f1 and the respective frequencies of the sensor signals are designated by f2 and f3.

Each of the electric power supply monitoring sections 7 is operable to monitor the electric power supply by measuring the value of the voltage of the electric power to be supplied to the corresponding sensor section 6A or 6B and the corresponding sensor signal transmitting section 9A or 9B. The measurement of this electric power voltage is carried out subject to the voltage after the received electric power has been converted into a direct current power. The respective electric power supply monitoring section 7 transmits a predetermined normal indication signal, superimposed on the sensor signal, to the associated sensor signal transmitting section 9A or 9B when the voltage of the electric power to be supplied is equal to or higher than a predetermined threshold value, and interrupts the transmission of the normal indication signal when such voltage is lower than the threshold value. In the event that the transmission of the normal indication signal is interrupted, the presence of an abnormality in the electric power to be supplied can be determined on the receiving side. It is to be noted that superimposition and interruption of the normal indication signal referred to above may be switched over depending on whether the voltage exceeds the threshold value or it is equal to or lower than the threshold value. In either case, the threshold value referred to above is set to a value higher than the lowest voltage at which the respective sensor section 6A or 6B and the corresponding sensor signal transmitting section 9A or 9B can operate properly.

Each of the electric power supply monitoring sections 7 is so designed as to transmit the value of a power source voltage to the respective sensor signal transmitting section 9A or 9B and the sensor signal receiving section 13 may be so designed as to check to see whether the supplied electric power is normal or abnormal. If a normal indication signal is transmitted when the power source voltage is normal, but transmission of the normal indication signal is interrupted when the power source voltage is abnormal, it is possible to monitor the lack of the supplied electric power and the presence or absence of an abnormality in each of the sensor signal transmitting sections 9A and 9B.

The lowest voltage at which each of the electric power supply monitoring sections 7 operates normally is preferably lower than the lowest voltage required for the sensor sections 6A and 6B and the sensor signal transmitting sections 9A and 9B to operate normally. Where the electric power supply units 10 are provided with respective capacitors or secondary batteries, the electric power available therefrom may be used to power the electric power supply monitoring sections 7.

The sensor signal receiving unit 5 is preferably provided with a monitor dependent electric power control section 14 to increase the electric power to be transmitted from the feed power transmitting section 12, when the electric power source voltage attains a value lower than a threshold value (or not higher than a threshold value), and to restore it back to a normal value when the electric power source voltage exceeds (or is not lower than) a threshold value. The threshold value at which the electric power to be transmitted is restored to the normal value may be set to a value lower than a threshold value at which the electric power to be transmitted is increased. In this way, frequent switching of the electric power can be avoided.

The sensor signal receiving unit 5 or the like may be provided with an abnormal time processing means 15 operable, when the electric power to be supplied does not restore even though the electric power to be transmitted is increased as a result of the electric power source voltage lowering to a value equal to or lower than the threshold value, to perform a predetermined processing for abnormality until it is restored.

Also, an abnormality indicating means 16 may be provided, which is operable to determine that one or both of the wireless sensor units 4B and 4B fail to operate properly, when the electric power to be supplied does not restore even after passage of a predetermined length of time subsequent to the increase of the electric power to be transmitted.

According to the wireless sensor system of the above described construction, since the feed voltage of each of the electric power supply sections 10 for transmitting an electric driving power to the corresponding sensor section 6A or 6B and the sensor signal transmitting section 9A or 9B is monitored by the associated electric power supply monitoring section 7, an indication of a failure of the electric power supply is effective to avoid an erroneous operation of the sensor section 6A or 6B and an erroneous operation of the wireless sensor system as a whole. Also, since the electric driving power of the respective electric power supply section 10 is monitored, a trouble occurring in the electric power source in the associated sensor section 6A or 6B and that in the associated sensor signal transmitting section 9A or 9B both resulting from failure to supply the electric power can be detected and, therefore, a simplified structure can be tailored as compared with the separate and additional use of an abnormality detecting means. Yet, if depending on the result of monitoring, a control is made to increase the electric power to be transmitted in the event of the power supply failure, there is no need to transmit a high electric power at all times and, therefore, the electric power consumption of the wireless sensor system can be reduced.

Figure 13:
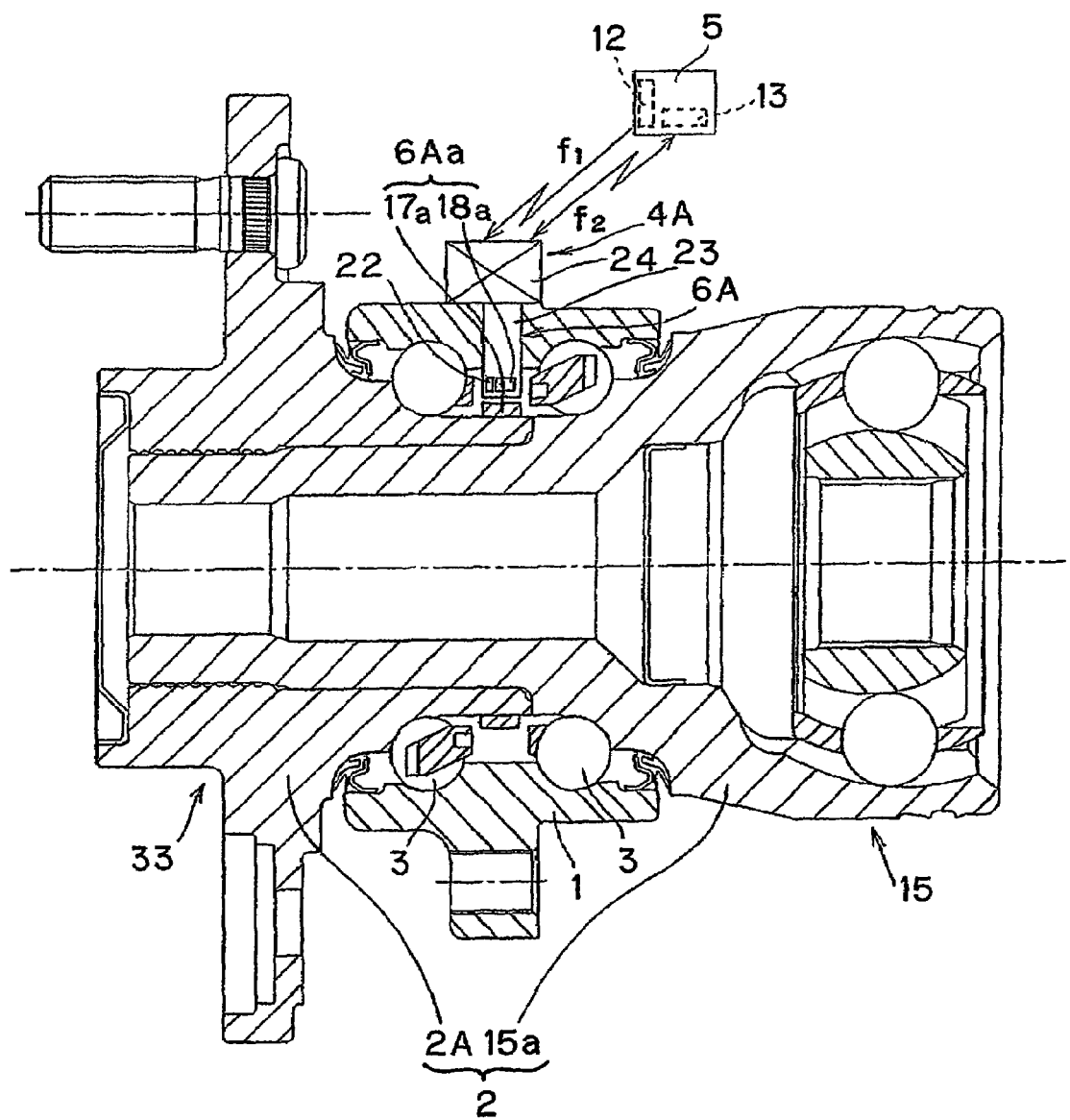
FIG. 13 is a longitudinal sectional view showing the different bearing assembly to which the wireless sensor system according to the first embodiment of the present invention is applied.

FIG. 13 illustrates a different application of the wireless sensor system according to the first embodiment to the wheel support bearing assembly. The wheel support bearing assembly 33 shown therein includes an outer member 1 having a plurality of raceways, an inner member 2 having raceways defined in face-to-face relation with the raceways referred to above, and two rows of rolling elements 3 interposed between the mutually confronting raceways and is used to rotatably support a vehicle wheel relative to a vehicle body. The wheel support bearing assembly 33 shown therein is of a fourth generation type, in which the inner member 2 is made up of a hub axle 2A and an outer race 15a of the constant velocity universal joint 15, with the raceways in the inner member 2 being defined in the hub axle 2A and the outer race 15a of the constant velocity universal joint 15, respectively.

The single wireless sensor unit 4A is mounted on the outer member 1 of the wheel support bearing assembly 33. The other wireless sensor unit 4B shown in FIG. 1 may be dispensed with or may be disposed separate from the wheel support bearing assembly 33 and in the vehicle wheel for detection of, for example, the tire pressure.

The wireless sensor unit 4A includes a revolution sensor 6Aa as a sensor forming a part of the sensor section 6A. This revolution sensor 6Aa is made up of a pulsar ring 17a and a magnetic sensor 18a disposed in face-to-face relation with the pulsar ring 17a. The pulsar ring 17a has a cyclical change in a direction circumferentially thereof such as a magnet magnetized to a plurality of magnetic poles in a direction circumferentially thereof, or a magnetic ring having defined therein serrations similar in shape to gear teeth. The magnetic sensor 18a, when detecting a cyclical magnetic change in the circumferential direction of the pulsar ring 17a, detects a revolution of the inner member 2 relative to the outer member 1 and subsequently outputs a revolution signal. This revolution signal is in the form of a train of pulses. The magnetic sensor 18a is a magnetic field sensor and, other than the magnetic reluctance type sensor (generally referred to as "MR sensor"), an active type magnetic field sensor such as, for example, a Hall type sensor, a flux gate type magnetic field sensor or an MR sensor can be employed. The magnetic sensor 18a may be disposed at two locations spaced about 90° in phase relative to the cycle of magnetic change in a direction circumferentially of the pulsar ring 17 so that revolution signals having a phase offset about 90° from each other can be transmitted. With those two revolutions signals, it is possible to detect the direction of revolution of the vehicle wheel.

The wireless sensor unit 4A forms an integrated unit, in which a circuit box 24 and a sensor mount 23 are integrated together, and the circuit box 24 is mounted externally on the outer member 1. The sensor mount 23 is accommodated within an annular bearing space delimited between the outer member 1 and the inner member 2 through a radial hole defined in the outer member 1 so as to extend radially thereof. A communication functional section, comprised of the electric power receiving section 8A and the sensor signal transmitting section 9A, both shown in FIG. 1, the electric power supply section 10 and the electric power supply monitoring section 7 are provided within the circuit box 24, and the magnetic sensor 18 referred to above is arranged in the sensor mount 23. As the other sensor forming the sensor section 6A, a sensor 22 for detecting information other than the revolutions is disposed in the sensor mount 23. This sensor 22 may be a temperature sensor, a vibration sensor, a load sensor, a preload sensor or the like.

The sensor signal receiving unit 5 is fitted to the vehicle body. For example, it may be fitted inside a tire housing of the vehicle body. The sensor signal received by the sensor signal receiving unit 5 is supplied to an electric control unit (ECU) secured to the vehicle body for controlling the entire electric control system of the automotive vehicle and is used for various control and abnormality monitoring.

Since the revolution sensor 6Aa includes a pulsar ring 17a and a magnetic sensor 18a cooperable with the pulsar ring 17a to detect the revolution and is supplied an electric power by wireless and, therefore, it can detect the revolution until a zero speed, it can be used with an anti-skid brake system and/or a traction control. By detecting the direction of revolution, it can be used for a hill hold control, for example, a control corresponding to detection of rearward movement of the automotive vehicle during ascending run or the reverse.

With the other sensor 22 such as, for example, a load sensor or a temperature sensor, a parameter other than the revolution can be detected and, therefore, the bearing assembly can be designed to be functionally intelligent, allowing it to be used for the self-diagnosis of the bearing assembly and also for the various automatic controls.

The electric power supply monitoring section 7 monitors the electric power being supplied, by measuring the value of the electric power source voltage. A monitor dependent electric power control section 14 is operable to increase the electric power to be transmitted from the feed power transmitting section 12, when the electric power source voltage attains a value lower than a threshold value (or not higher than a threshold value), and to restore it back to a normal value when the electric power source voltage exceeds (or is not lower than) a threshold value. In the event that the electric power to be supplied does not restore to the normal value even though the electric power to be transmitted is increased, an abnormal time processing means 15 performs a predetermined abnormality processing until it is restored. By way of example, in the anti-skid brake system, the anti-skid braking functionality thereof is halted so that the normal braking operation can be performed.

Also, in the event that the electric power to be supplied does not restore even after passage of a predetermined length of time subsequent to the increase of the electric power to be transmitted, an abnormality indicating means 16 determines and then indicates that one or both of the wireless sensor units 4B and 4B fail to operate properly.

As hereinabove described, it is possible to avoid any erroneous operation of the sensor section 6A when the electric power to be supplied is monitored through measurement of the electric power source voltage and the presence of an abnormality in the electric power being supplied is indicated. Also, by allowing a signal indicative of the electric power being supplied to be transmitted, the electric power to be transmitted for the electric power supply can be controlled and, therefore, there is no need to transmit the large electric power at all times, allowing the electric power consumption of the wireless sensor system to be reduced. This leads to increase of the mileage.

Figure 14:
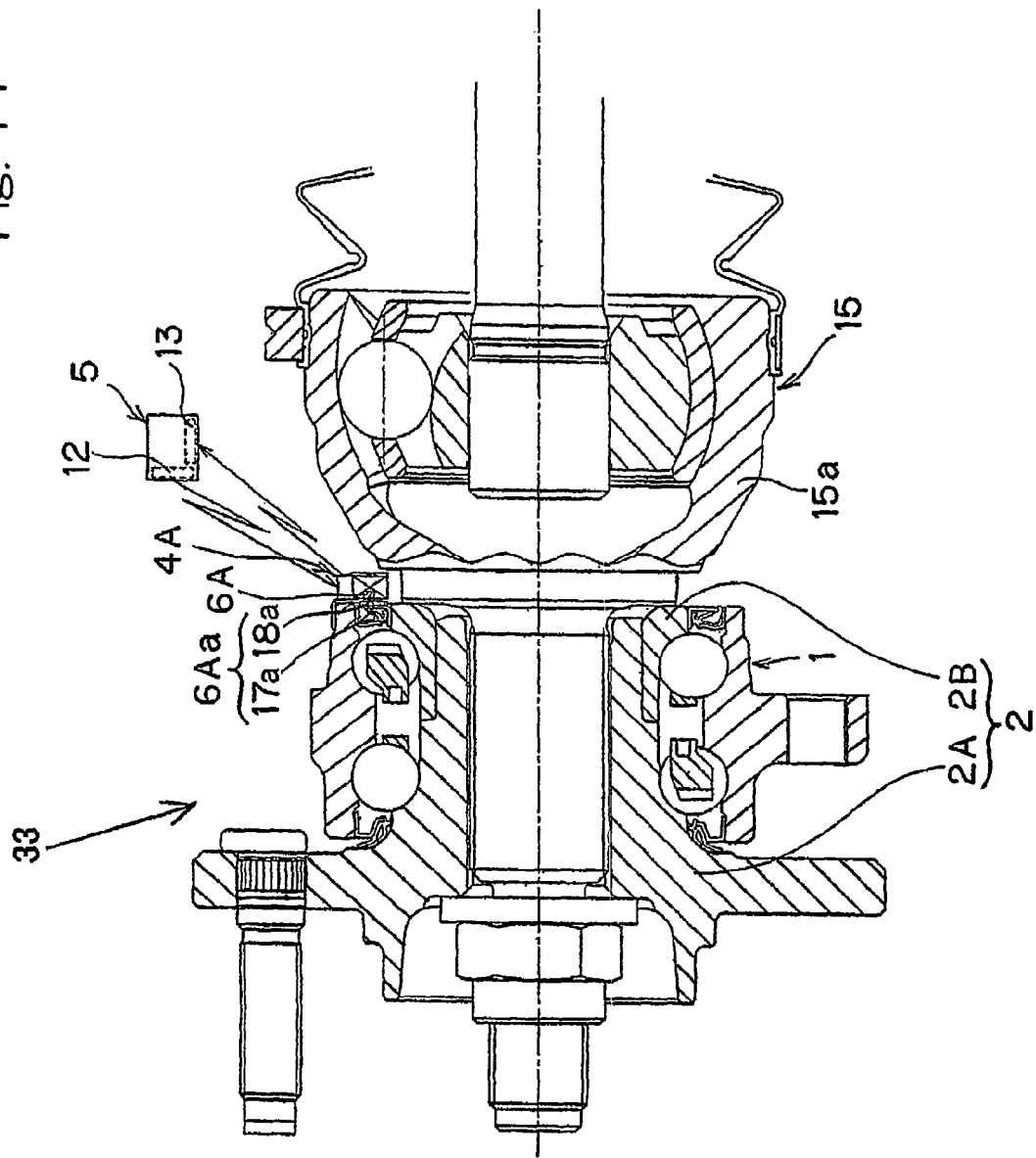
FIG. 14 is a longitudinal sectional view showing the further wheel support bearing assembly to which the wireless sensor system according to the first embodiment of the present invention is applied.

FIG. 14 illustrates an example, in which this wireless sensor system is applied to a different type of the wheel support bearing assembly 33. This wheel support bearing assembly 33 is of a third generation type, in which the inner member 2 is made up of a hub axle 2A and an inner race segment 2B mounted externally on one end of the hub axle 2A and raceways in the inner member 2 for the respective rows of the rolling elements are defined in the hub axle 2A and the inner race segment 2B, respectively. The constant velocity universal joint 15 has a shaft portion provided in an outer race 15a thereof and inserted into the hub axle 2A and is then coupled thereto by means of a nut.

The wireless sensor unit 4A is mounted on an end of the outer member 1. The sensor section 6A of the wireless sensor unit 4A is in the form of a revolution sensor 6Aa including a pulsar ring 17, mounted on the inner member 2, and a magnetic sensor 18 disposed in face-to-face relation with the pulsar ring 17. The pulsar ring 17 in turn includes a multipolar magnet or the like. The pulsar ring 17 is arranged on a component part of the sealing member used to seal the annular bearing space delimited between the outer member 1 and the inner member 2. The magnetic sensor 18 is employed in the form of a magnetic reluctance sensor or a Hall element sensor. Other structural features thereof are similar to those in the example shown in FIG. 3.

Figure 15:
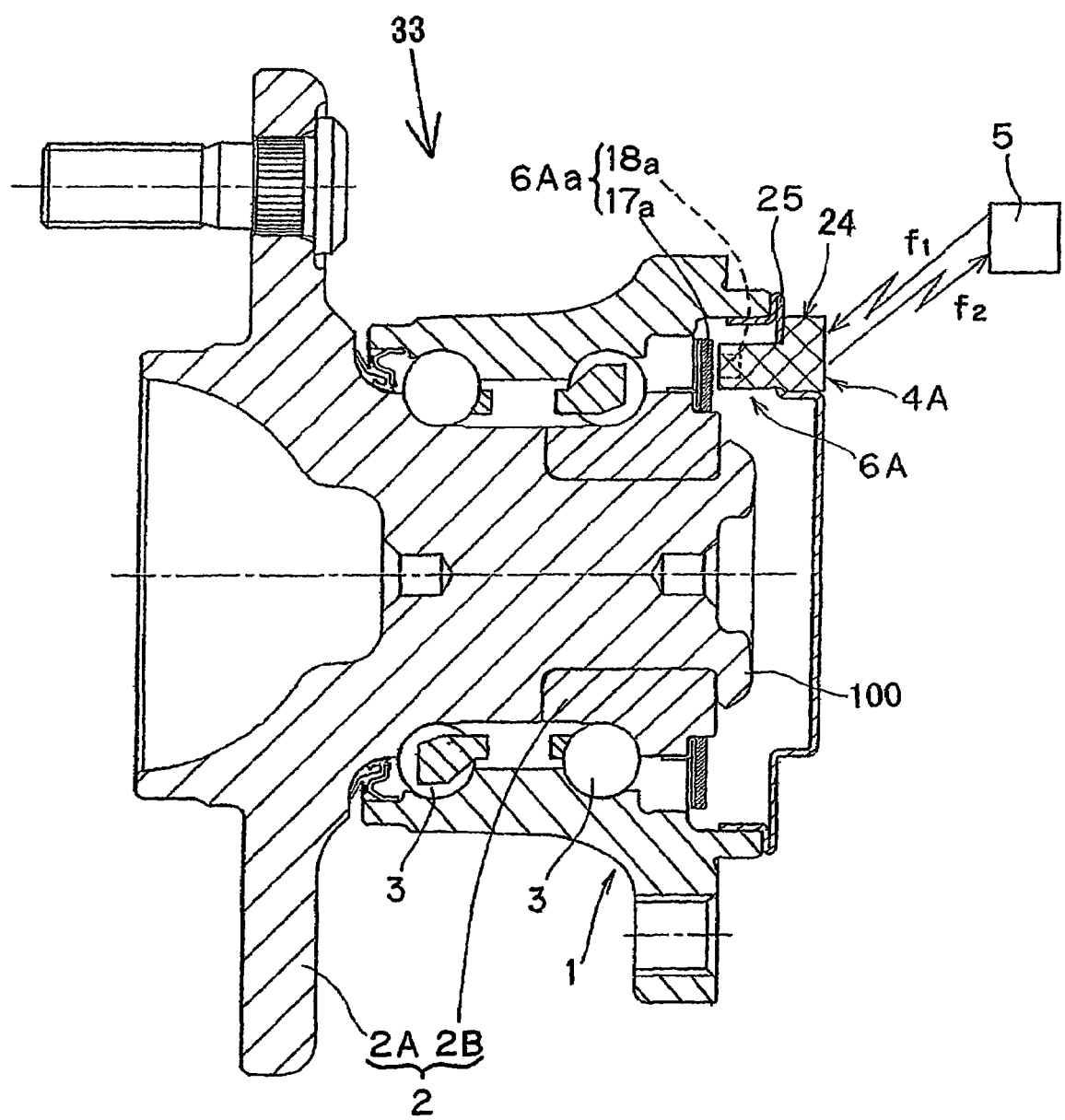
FIG. 15 is a longitudinal sectional view showing the still further wheel support bearing assembly to which the wireless sensor system according to the first embodiment of the present invention is applied.

FIG. 15 illustrates a different case in which this wireless sensor system is applied to a further different wheel support bearing assembly 33. This wheel support bearing assembly 33 is of a third generation type for supporting an vehicle driven wheel. In this example, the wireless sensor unit 4A is secured to a cover 25 for covering one end of the bearing assembly. The wireless sensor unit 4A makes use of, as the sensor section 6A, a revolution sensor 6Aa made up of a pulsar ring 17a and a magnetic sensor 18a. The sensor section 6A including the magnetic sensor 18a has its free end inserted into a hole defined in the cover 25 and a circuit box 24 is arranged on an outer surface of the cover 25. Other structural features of this embodiment are similar to those in the example shown in FIG. 14. It is to be noted that the inner race segment 2B is fixedly coupled with the hub axle 2A by means of a crimped portion 100 formed by crimping one end of the hub axle 2A.

Figure 16:
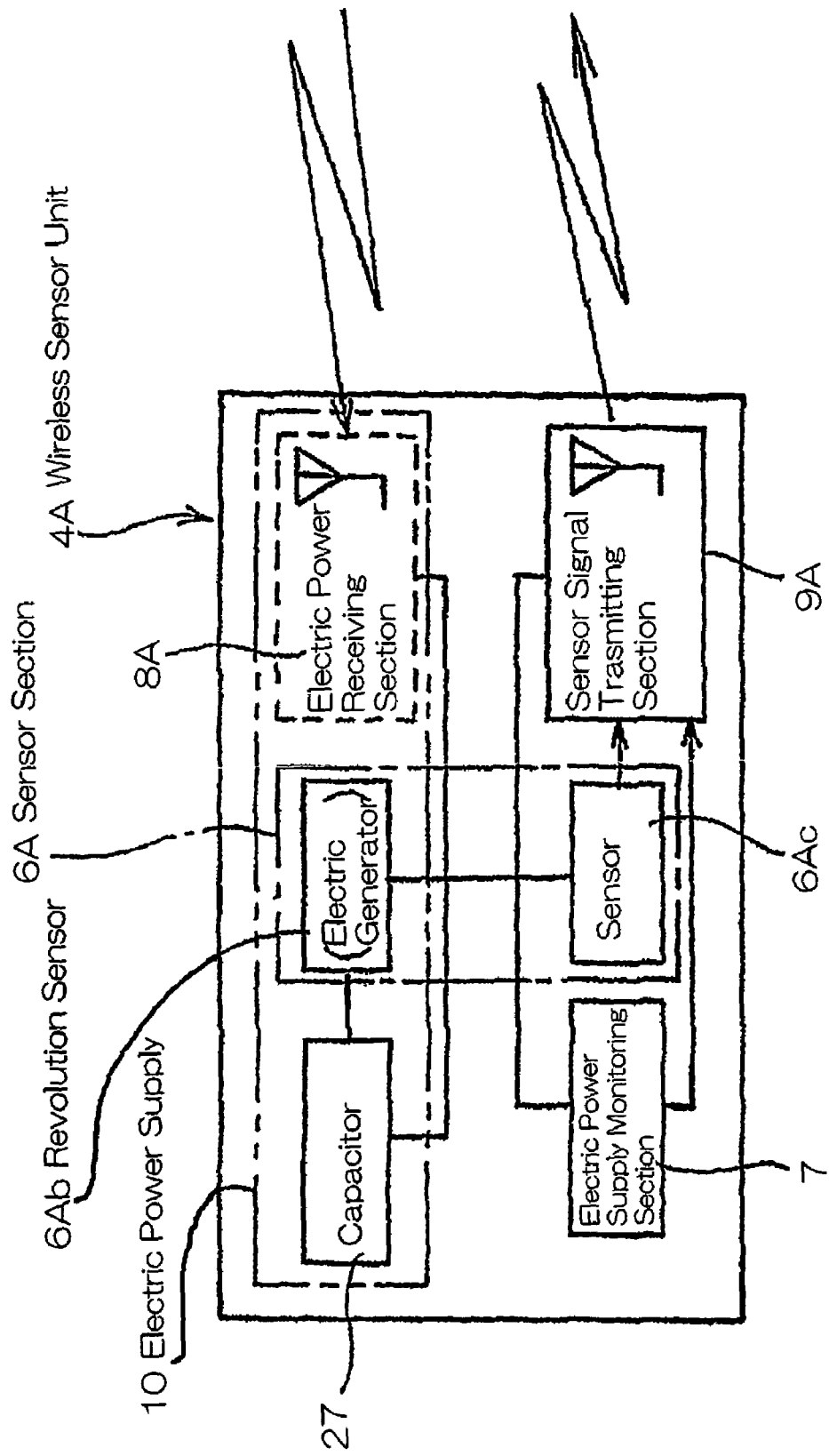
FIG. 16 is a circuit section diagram of a wireless sensor unit of the wireless sensor system according to a fourth preferred embodiment of the present invention.

FIG. 16 illustrates the wireless sensor unit according to a fourth preferred embodiment of the present invention. This wireless sensor system makes use of the wireless sensor unit 4A including, as the sensor section 6A thereof, a revolution sensor 6Ab having an electric power generating capability, and the electric power supply section 10 utilizes an electric power generated by the revolution sensor 6Ab. In this figure, the use is shown of another sensor section 6Ac separate from the sensor section 6Ab serving as an electric power generator, but the sensor may be of a type including only the revolution sensor of an electric power generating type. It is to be noted that the electric power supply section 10 may include an electric power receiving section 8A, as shown by the broken line in FIG. 16, which utilizes both of an electric power generated by the revolution sensor 6Ab and an electric power received by the electric power receiving section 8A. The electric power supply section 10 has a capacitor 27. The electric power supply monitoring section 7 is rendered to monitor the feed power voltage of this electric power supply section 10. Other structural feature of this embodiment are similar to those in the embodiment shown in FIG. 1.

As hereinbefore described, even where the electric power generated by the revolution sensor 6Ab is utilized, the provision of the electric power supply monitoring section 7 for monitoring the voltage of the electric power supply section 10 of the wireless sensor unit 4A allows both of an abnormal electric power of the sensor sections 6Ab and 6Ac and an abnormality occurring in the electric power supply of the sensor signal transmitting section 9A, to be detected and, therefore, as compared with the separate use of abnormality detecting means, the structure can be simplified.

Figure 17:
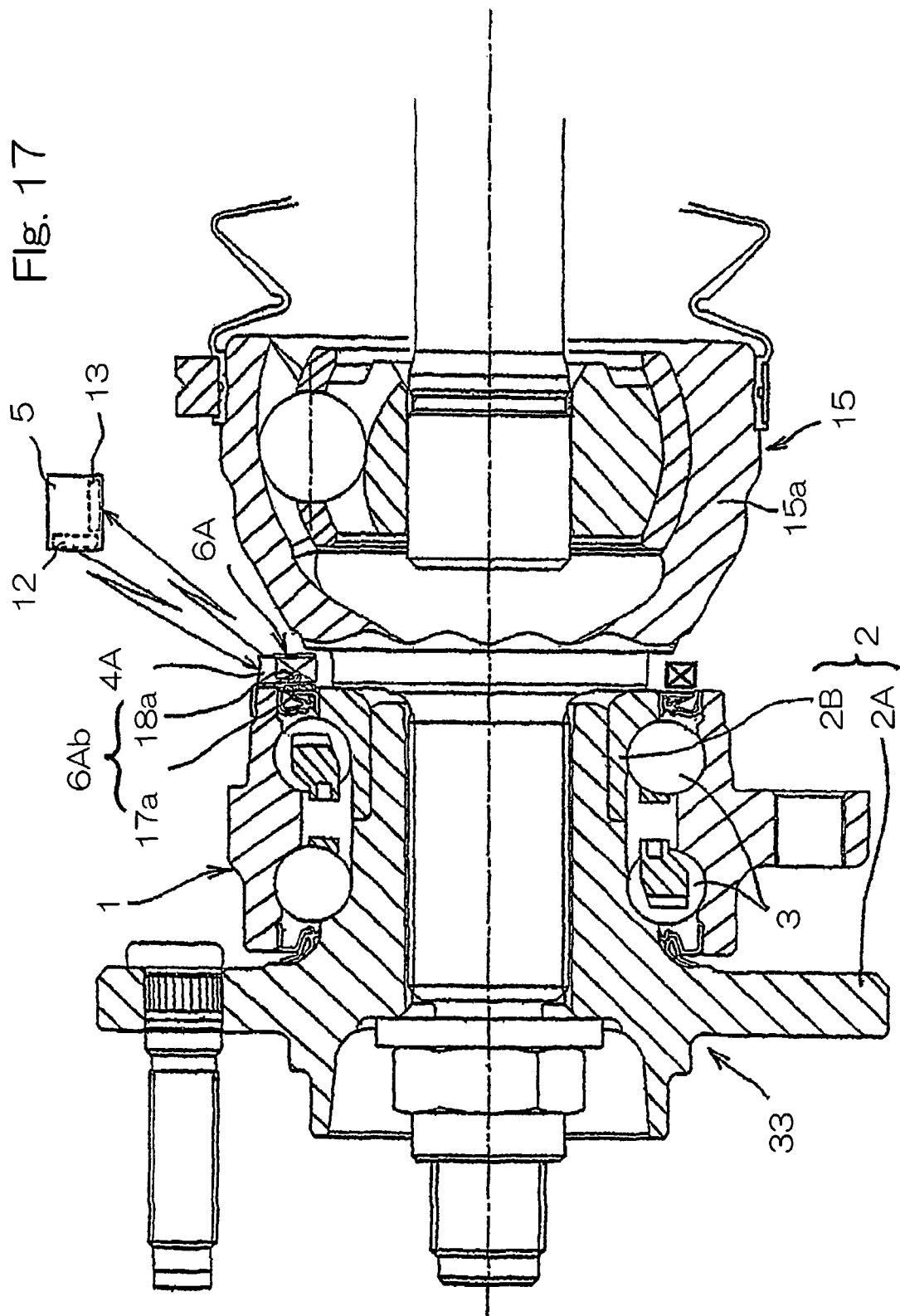
FIG. 17 is a longitudinal sectional view of the wheel support bearing assembly to which the wireless sensor system according to the fourth embodiment of the present invention is applied.

FIG. 17 illustrates an example of the wheel support bearing assembly 33 utilizing the revolution sensor 6Ab of the electric power generating type in the wireless sensor unit 4A. This wheel support bearing assembly 33 is of a type, in which in the third generation type shown in FIG. 14, the revolution sensor 6Ab used therein is employed in the form of an electric power generating type. The pulsar ring 17a of the revolution sensor 6Ab is a multipolar magnet type as shown in FIG. 14, and the magnetic sensor 18a is comprised of a coil and a core so that rotation of the pulsar ring 17a relative to the magnetic sensor 18a can result in generation of an electric power. Other structural feature of this embodiment are similar to those in the example shown in FIG. 14.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wireless sensor system, comprising:
   one or a plurality of wireless sensor units including a sensor section to detect a detection object, a sensor signal transmitting section to transmit wirelessly a sensor signal outputted from the sensor section, and an electric power supply section to supply an electric driving power to the sensor section and the sensor signal transmitting section;
   a sensor signal receiving unit to receive the sensor signal transmitted from the sensor signal transmitting section;
   an electric power supply monitoring section to monitor a voltage of the electric power supply section;
   an electric power receiving section provided in the electric power supply section to receive an electric driving power transmitted wirelessly from a feed power transmitting section; and
   a monitor dependent control section to regulate an electric power to be transmitted from the feed power transmitting section, in dependence on a monitored result information.

2. The wireless sensor system as claimed in claim 1, wherein the feed power transmitting section is provided in the sensor signal receiving unit.

3. The wireless sensor system as claimed in claim 1, wherein the electric power supply monitoring section monitors the voltage after the electric power received by the electric power receiving section has been converted into a direct current.

4. The wireless sensor system as claimed in claim 1, wherein the sensor signal transmitting section transmits a predetermined normal indication signal when the voltage monitored by the electric power supply monitoring section is equal to or higher than, or exceeds, a predetermined threshold value, and interrupts the transmission of the normal indication signal when such voltage is lower than, or equal to or lower than, the predetermined threshold value.

5. The wireless sensor system as claimed in claim 1, wherein the sensor section includes a revolution sensor having an electric power generating function, and
   wherein the electric power supply section utilizes an electric power generated by the revolution sensor.

6. The wireless sensor system as claimed in claim 1, wherein the sensor section includes at least one of a vibration sensor, a temperature sensor, a load sensor, a torque sensor, and a preload sensor to detect a preload of a bearing assembly.

7. The wireless sensor system as claimed in claim 1, wherein the sensor section is provided in a plural number.

8. The wireless sensor system as claimed in claim 1, wherein there is provided a plurality of wireless sensor units, each of the wireless sensor units including the sensor section, the sensor signal transmitting section and the electric power receiving section.

9. The wireless sensor system as claimed in claim 1, wherein there is provided one wireless sensor unit including a plurality of the sensor sections, the sensor signal transmitting section and the electric power receiving section, and
   wherein the sensor signal transmitting section transmits respective sensor signals from the plural sensor sections.

10. The wireless sensor system as claimed in claim 1, wherein the sensor section is arranged in a bearing assembly.

11. The wireless sensor system as claimed in claim 1, wherein a plurality of wireless sensor units are arranged in different bearing assemblies in a machine setup.

12. A wireless sensor equipped bearing assembly comprising:
   a bearing assembly; and
   the wireless sensor system as claimed in claim 1, including the sensor section, the sensor signal transmitting section, and the electric power receiving section to receive wirelessly an electric operating power for the sensor section and the sensor signal transmitting section, all provided in the bearing assembly,
   wherein the sensor section includes at least one of a vibration sensor to detect a vibration of the bearing assembly, a temperature sensor to detect a temperature of the bearing assembly, a load sensor to detect a load acting on the bearing assembly, a torque sensor to detect a torque acting on the bearing assembly, and a preload sensor to detect a preload of the bearing assembly.

13. A wireless sensor equipped wheel support bearing assembly to rotatably support a vehicle wheel relative to a vehicle body, comprising:
   an outer member having a plurality of raceways;
   an inner member having raceways defined in face-to-face relation to the raceways; and
   a plurality of rows of rolling elements interposed between the mutually confronting raceways,
   wherein the wheel support bearing assembly comprises the bearing assembly as defined in claim 12.

14. A wireless sensor equipped bearing assembly, wherein the wireless sensor unit in the wireless sensor system as claimed in claim 1 is employed in the bearing assembly.

15. A wireless sensor equipped wheel support bearing assembly to rotatably support a vehicle wheel relative to a vehicle body, comprising:
- an outer member having a plurality of raceways;
- an inner member having raceways defined in face-to-face relation to the raceways; and
- a plurality of rows of rolling elements interposed between the mutually confronting raceways,
- wherein the wheel support bearing assembly comprises the wireless sensor unit in the wireless sensor system as claimed in claim 1.

16. The wireless sensor equipped wheel support bearing assembly as claimed in claim 15, wherein the sensor section in the wireless sensor unit includes a revolution sensor for detecting a relative revolution of the outer member to the inner member.

17. The wireless sensor system as claimed in claim 1, wherein the electric power supply monitoring section transmits a monitored result information from the sensor signal transmitting section in the wireless sensor unit to the sensor signal receiving unit.

* * * * *